United States Patent
Pyeon

(10) Patent No.: US 8,677,084 B2
(45) Date of Patent: *Mar. 18, 2014

(54) METHOD OF CONFIGURING NON-VOLATILE MEMORY FOR A HYBRID DISK DRIVE

(71) Applicant: MOSAID Technologies Incorporated, Ottawa (CA)

(72) Inventor: Hong Beom Pyeon, Ottawa (CA)

(73) Assignee: MOSAID Technologies Incorporated, Ottawa, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/655,582

(22) Filed: Oct. 19, 2012

(65) Prior Publication Data

US 2013/0046921 A1 Feb. 21, 2013

Related U.S. Application Data

(63) Continuation of application No. 12/827,718, filed on Jun. 30, 2010, now Pat. No. 8,296,521, which is a continuation-in-part of application No. 11/428,050, filed on Jun. 30, 2006, now abandoned.

(51) Int. Cl.
*G06F 13/00* (2006.01)

(52) U.S. Cl.
USPC ........... 711/156; 711/103; 711/113; 711/129; 711/154

(58) Field of Classification Search
USPC ................... 711/103, 112, 113, 129, 154, 156
See application file for complete search history.

(56) References Cited

U.S. PATENT DOCUMENTS

| 4,908,793 A | 3/1990 | Yamagata et al. |
| 5,437,018 A | 7/1995 | Kobayashi et al. |

(Continued)

FOREIGN PATENT DOCUMENTS

| TW | 200301422 | 7/2003 |
| TW | 200615946 | 5/2006 |
| WO | 94/22075 | 9/1994 |
| WO | 00/08589 | 2/2000 |

OTHER PUBLICATIONS

Matt Woodward, (USB 2.0 Hi-Speed Flash Drive Roundup (2004) ), Jun. 3, 2004, pp. 1 to 3, http://arstechnica.com/hardware/reviews/2004/06/flash.ars/8.
U.S. Appl. No. 11/428,050, Office Action dated Jan. 10, 2011.

(Continued)

*Primary Examiner* — Reba I Elmore
(74) *Attorney, Agent, or Firm* — Curtis B. Behmann; Borden Ladner Gervais LLP

(57) ABSTRACT

A system, method and machine-readable medium are provided to configure a non-volatile memory (NVM) including a plurality of NVM modules, in a system having a hard disk drive (HDD) and an operating system (O/S). In response to a user selection of a hybrid drive mode for the NVM, the plurality of NVM modules are ranked according to speed performance. Boot portions of the O/S are copied to a highly ranked NVM module, or a plurality of highly ranked NVM modules, and the HDD and the highly ranked NVM modules are assigned as a logical hybrid drive of the computer system. Ranking each of the plurality of NVM modules can include carrying out a speed performance test. This approach can provide hybrid disk performance using conventional hardware, or enhance performance of an existing hybrid drive, while taking into account relative performance of available NVM modules.

21 Claims, 21 Drawing Sheets

(56) References Cited

U.S. PATENT DOCUMENTS

| | | | |
|---|---|---|---|
| 5,535,357 | A | 7/1996 | Moran |
| 5,742,792 | A | 4/1998 | Yanai et al. |
| 5,778,418 | A | 7/1998 | Auclair |
| 5,860,083 | A * | 1/1999 | Sukegawa ............... 711/103 |
| 6,129,572 | A * | 10/2000 | Feldman et al. ........... 439/328 |
| 6,745,261 | B2 | 6/2004 | Inoue |
| 6,785,767 | B2 | 8/2004 | Coulson |
| 7,069,370 | B2 | 6/2006 | Sukegawa et al. |
| 8,015,433 | B2 | 9/2011 | Chu et al. |
| 8,032,700 | B2 | 10/2011 | Bruce et al. |
| 8,296,521 | B2 * | 10/2012 | Pyeon ...................... 711/129 |
| 2001/0014923 | A1 | 8/2001 | Inoue |
| 2002/0083264 | A1 * | 6/2002 | Coulson ................... 711/112 |
| 2003/0110244 | A1 | 6/2003 | Mondal |
| 2004/0153595 | A1 | 8/2004 | Sukegawa et al. |
| 2005/0235045 | A1 | 10/2005 | Narayanaswami et al. |
| 2005/0268082 | A1 | 12/2005 | Poisner |
| 2005/0283600 | A1 | 12/2005 | Giannotti et al. |
| 2006/0130142 | A1 | 6/2006 | Mester et al. |
| 2008/0005462 | A1 | 1/2008 | Pyeon et al. |
| 2010/0037017 | A1 | 2/2010 | Ryu et al. |

OTHER PUBLICATIONS

"Bootable USB Flash Drive", The PC Spy, http://thepcspy.com/read/bootable_usb_flash_drive/, Oct. 23, 2005, pp. 1-17.

Tom Archer's Blog, http://blogs.msdn.com/tomarcher/archive/2006/06/02/readyboost-q-a.aspx, Jun. 2, 2006, pp. 1-80.

Matas et al., "Memory 1997", Integrated Circuit Engineering, pp. 1-18, http://smithsonianchips.si.edu/ice/cd/MEMORY97/TITLE.pdf, retrieved from internet at least as early as Dec. 31, 2009.

PCT Patent Application No. PCT/CA2007/001167, International Preliminary Report on Patentability dated Jan. 15, 2009.

New Apple Laptop to Feature Intel Robson Cache Technology?, AppleInsider, Thursday, Jan. 5, 2006, www.appleinsider.com/article.php?id-1442.

Intel's Robson Boosts Hard Drive Performance, ExtremeTech, Mar. 10, 2006, www.extremetech.com/print_article2/0,1217,a=173271,00.asp.

EE Times, NAND to invade PCs, analyst says, Jun. 29, 2006, http://www.eetimes.com/showArticle.jhtml;jsessionid=ZH1SRHHA1RLZKQSNDLPCKHSCJUNN2JVN?articleID=189700156.

Tom Archer's Blog, ReadyBoost—Using Your USB Key to Speed Up Windows Vista, Apr. 14, 2006, http://blogs.msdn.com/tomarcher/archive/2006/04/14/576548.aspx.

Whatis, "Keychain Drive", Dec. 21, 2002, pp. 1-2., http://web.archive.org/web/20021221212600/http://searchstorage.techtarget.com/sDefinition/0,,sid5_gci869057,00.html.

Wellesley College, "How to Use a USB Drive", Aug. 20, 2004, pp. 1-4, http://web.archive.org/web/20040820085536/http://www.wellesley.edu/Computing/Flashdrive/.

U.S. Appl. No. 11/428,050, Office Action dated Sep. 10, 2010.

TechTarget, "Boot", Jul. 2000, pp. 1-13, http://searchwinit.techtarget.com/definition/boot.

* cited by examiner

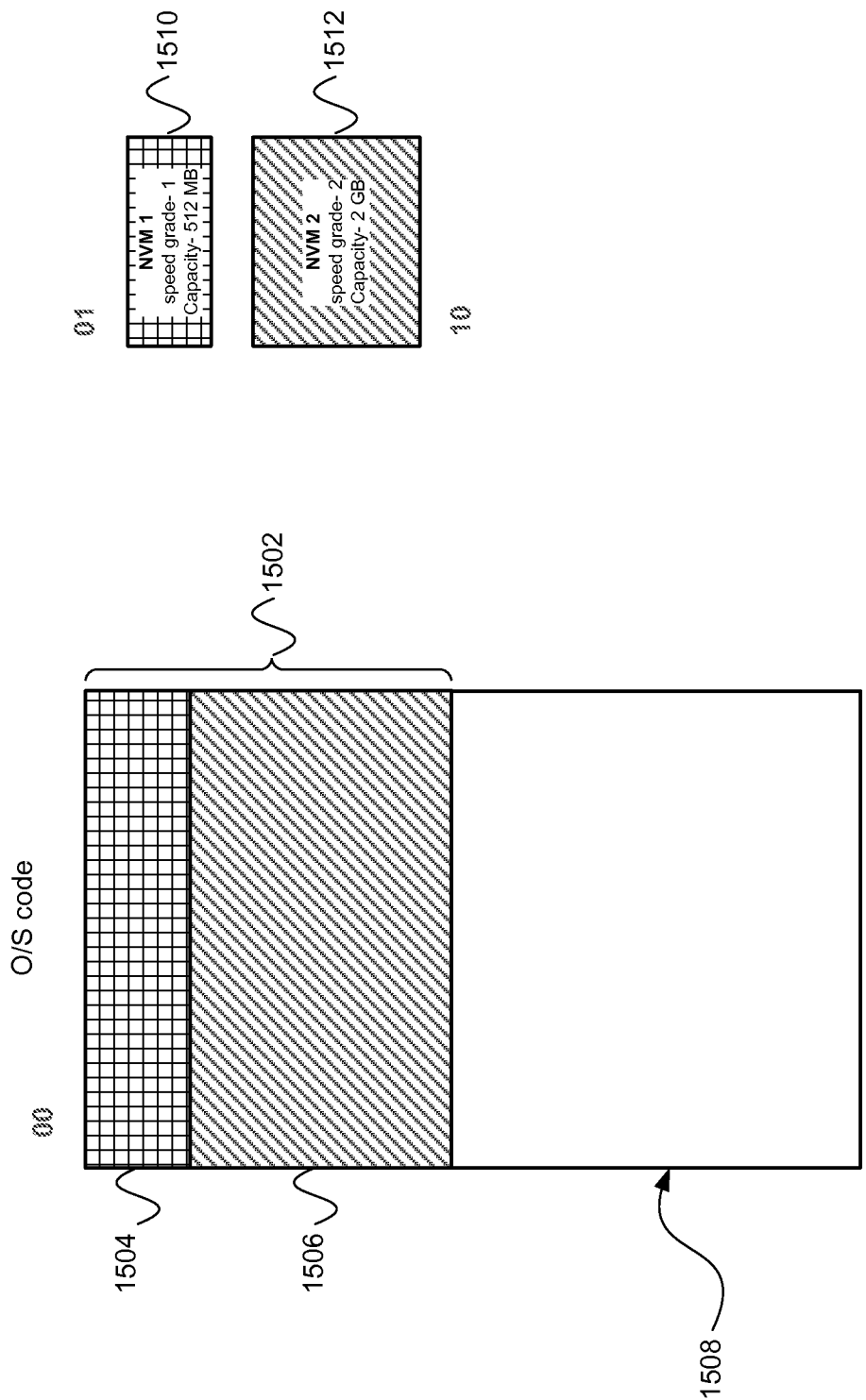

| NVM location | NVM type | NVM class (rating) | NVM performance grade | NVM density | Pseudo-random Test result | NVM performance rank |
|---|---|---|---|---|---|---|
| Connector 1 | Compact flash | 32x | 4.8MB/s | 2G Byte | 4.5MB/s | 5 |
| Connector 2 | Compact flash | 100x | 15MB/s | 1G Byte | 13MB/s | 3 |
| Connector 3 | SD card | 13x | 2.0MB/s | 1G Byte | 1.8MB/s | 7 |
| Connector 4 | SD card | 100x | 15MB/s | 512M Byte | 12MB/s | 4 |
| Connector 5 | MMC | - | 2.5MB/s | 512M Byte | 2.3MB/s | 6 |
| Connector 6 | USB flash | - | Varied (30 ~ 12MB/s) | 512M Byte | 20MB/s | 1 |
| Connector 7 | USB flash | - | Varied (30 ~ 12MB/s) | 1G Byte | 18MB/s | 2 |

FIG. 16

METHOD OF CONFIGURING NON-VOLATILE MEMORY FOR A HYBRID DISK DRIVE

CROSS REFERENCE TO RELATED APPLICATIONS

This application is a continuation of U.S. application Ser. No. 12/827,718 filed on Jun. 30, 2010, now issued as U.S. Pat. No. 8,296,521, on Oct. 23, 2012 which is a continuation-in-part of U.S. Ser. No. 11/428,050 filed on Jun. 30, 2006, and the disclosures of all of the above applications are expressly incorporated herein by reference in their entirety.

FIELD

The present disclosure relates generally to a hybrid disk configuration. More particularly, the present disclosure relates to non-volatile memory and its use with a hard disk drive as part of a hybrid disk.

BACKGROUND

Generally, the processing speed of a computer's central processing unit (CPU) has increased far more quickly than the access speed for a computer's hard disk drive (HDD). This speed gap between the CPU and the HDD contributes to application delay and can also increase power usage due to excessive spinning of the HDD. A hybrid drive is a computer hard drive configuration that addresses this speed gap. In a hybrid drive, non-volatile memory is used to supplement the spinning hard disk drive, in order to provide faster boot and resume by using faster memory, and to provide lower power consumption by keeping the HDD's spindle motor in idle mode more often. Such a hybrid drive configuration is particularly advantageous for battery operated computer systems, such as mobile computers or other mobile computing devices.

A simplified known hybrid drive configuration will be described. Referring to FIG. 1A which shows a known hybrid drive configuration 100, a non-volatile memory (NVM) cache 102 is added to be physically part of an HDD 104, to store frequently used sectors for fast boot and resume times. The HDD 104 with its on-board NVM cache 102 is placed on a system board, or motherboard, 106. Such an approach is typically supported by the computer's operating system.

Referring to FIG. 1B which shows another known hybrid drive configuration 110, an NVM cache 112 is provided directly on a computer's system board 114 and is in communication with an HDD 116 via the system board 114. If the entire operating system (O/S) is loaded in the NVM 112, booting can occur directly from the cache.

In each of the configurations in FIGS. 1A and 1B, a 128 MB minimum is currently recommended for the non-volatile memory cache. Non-volatile memory can be implemented in a hybrid HDD by way of an embedded flash disk, a one-chip solution using NAND flash memory die with existing HDD controllers, or a NAND flash memory die with a dedicated NAND controller.

U.S. Pat. No. 5,778,418 granted to Auclair et al. on Jul. 7, 1998 teaches the use of a common memory controller circuit to mediate access of the operating system to a combined mass storage system including a flash electrically erasable programmable read-only memory system and a rotating disk drive memory.

However these approaches cannot be used with existing computer hardware setups. The configuration in FIG. 1A requires a hard disk upgrade, where the new modified hard disk with NVM can have a unique form factor and require a unique interface. The configuration in FIG. 1B requires a system board upgrade, though a conventional HDD can be used. The approach in taught in U.S. Pat. No. 5,778,418 requires extra hardware in the form of a common memory controller circuit. In all of these approaches, the NVM memory is only dedicated for use as a non-volatile hard disk cache and is not easily replaced or upgraded.

Some operating systems permit creation of a "boot disk". This is typically done on a removable medium for a spinning drive (floppy disk, CD or DVD), which can only hold a subset of the O/S booting portions for emergency purposes, and cannot hold the entire O/S. There is typically no space left on the removable medium for a spinning drive to act as a non-volatile cache for the hard disk drive. Moreover, since it is intended for use in a spinning drive, this boot disk approach does not solve the problem of decreased access speed and increased power consumption caused by spinning motors.

SUMMARY

In a first aspect, the present disclosure provides a method of configuring an NVM including a plurality of NVM modules, in a computer system having an HDD and an O/S, the method comprising: receiving a user selection of a hybrid drive mode for the NVM; ranking each of the plurality of NVM modules according to speed performance; in response to the user selection, copying a first portion of boot portions of the O/S to the highest ranked NVM module; and assigning the HDD and the highest ranked NVM module as a logical hybrid drive of the computer system.

In an embodiment, copying boot portions of the O/S to the highest ranked NVM module can comprise copying a first portion of boot portions of the O/S to the highest ranked NVM module. The method can further comprise: copying a second portion of boot portions of the O/S to the second highest ranked NVM module; and assigning the second highest ranked NVM module to the logical hybrid drive of the computer system.

Ranking each of the plurality of NVM modules may comprise carrying out a speed performance test, wherein the plurality of NVM modules are ranked based on results of the speed performance test. Carrying out the speed performance test may comprise: sending a performance checking pattern to the plurality of NVM modules; and receiving a speed performance test result for each of the plurality of NVM modules.

Ranking each of the plurality of NVM modules may comprise detecting stored speed performance information, and wherein the plurality of NVM modules are ranked based on the stored performance information. Ranking each of the plurality of NVM modules may further comprise carrying out a speed performance test, wherein the plurality of NVM modules are re-ranked based on results of the speed performance test. Carrying out the speed performance test may comprise: sending a performance checking pattern to the plurality of NVM modules; and receiving a speed performance test result for each of the plurality of NVM modules.

Ranking each of the plurality of NVM modules may comprise generating a performance table for the plurality of NVM modules. Ranking each of the plurality of NVM modules may comprise ranking the first NVM module higher than the second NVM module when the first and second NVM modules have substantially the same speed performance and the first NVM module has a higher capacity than the second NVM module.

Copying the first portion of boot portions of the O/S to the highest ranked NVM module may comprise: determining that the highest ranked NVM module has sufficient capacity to store an indivisible boot portion within the first portion. The first and second portions of boot portions of the O/S may have first and second sizes, respectively, and the method may further comprise, before copying the first portion of boot portions of the O/S to the highest ranked NVM module: defining the first and second sizes based on defined indivisible boot portions within the boot portions of the O/S.

The method may further comprise: detecting an NVM connection modification; and altering a logical hybrid drive definition based on the detected NVM connection modification. Detecting the NVM connection modification may comprise detecting removal of the first NVM module or the second NVM module, the first and second NVM modules having boot portions of the O/S copied thereon. Altering the logical hybrid drive definition may comprise, in relation to NVM modules remaining after the removal: copying the first portion of boot portions of the O/S to the highest ranked remaining NVM module; copying the second portion of boot portions of the O/S to the second highest ranked remaining NVM module; and assigning the HDD and the highest and second highest ranked remaining NVM modules as a logical hybrid drive of the computer system.

Detecting the NVM connection modification may comprise detecting addition of an additional NVM module to create a new plurality of NVM modules, and altering the logical hybrid drive definition may comprise: re-ranking each of the new plurality of NVM modules according to speed performance; copying the first portion of boot portions of the O/S to the highest re-ranked NVM module in the new plurality of NVM modules; copying the second portion of boot portions of the O/S to the second highest re-ranked NVM module in the new plurality of NVM modules; and assigning the HDD and the highest re-ranked NVM module and the second highest re-ranked NVM module in the new plurality of NVM modules as a logical hybrid drive of the computer system.

In an aspect, the present disclosure provides a computer system including an HDD, NVM including first and second NVM modules and an operating O/S, comprising: a machine-readable medium storing commands and instructions which, when executed, cause a processor to perform a method of configuring a non-volatile memory. The method may include: receiving a user selection of a hybrid drive mode for the NVM, ranking each of the plurality of NVM modules according to speed performance; in response to the user selection: copying boot portions of the O/S to the highest ranked NVM module; and assigning the HDD and the highest ranked NVM module as a logical hybrid drive of the computer system. In an embodiment, copying boot portions of the O/S to the highest ranked NVM module may comprise copying a first portion of boot portions of the O/S to the highest ranked NVM module. The method may further comprise: copying a second portion of boot portions of the O/S to the second highest ranked NVM module; and assigning the second highest ranked NVM module to the logical hybrid drive of the computer system.

The NVM may be removable and replaceable without performing an internal computer system hardware upgrade. The NVM may comprise a flash memory card.

The computer system may further comprise a receiver for receiving the NVM, the receiver being in electrical communication with the processor. The receiver may comprise a slot for receiving the NVM, the slot being accessible by a user without opening an outer casing of the computer system, the slot including a securing means to prevent disconnection of the NVM when the NVM is being used in hybrid drive mode.

In an aspect, the present disclosure provides a non-transitory machine-readable medium storing commands and instructions which, when executed, cause a processor to perform a method of configuring an NVM including first and second NVM modules in a computer system having an HDD, and an O/S, the method comprising: receiving a user selection of a hybrid drive mode for the NVM, ranking each of the plurality of NVM modules according to speed performance; in response to the user selection: copying boot portions of the O/S to the highest ranked NVM module; and assigning the HDD and the highest ranked NVM module as a logical hybrid drive of the computer system. In an embodiment, copying boot portions of the O/S to the highest ranked NVM module may comprise copying a first portion of boot portions of the O/S to the highest ranked NVM module. The method may further comprise: copying a second portion of boot portions of the O/S to the second highest ranked NVM module; and assigning the second highest ranked NVM module to the logical hybrid drive of the computer system. Other embodiments regarding the previously-describe method are also applicable to the non-transitory machine-readable medium.

In an aspect, the present disclosure provides a method of configuring an NVM including a plurality of NVM modules, in a computer system having an HDD and an O/S, the method including: receiving a user selection of a hybrid drive mode for the NVM, determining a speed performance for each of the plurality of NVM modules; in response to the user selection, copying boot portions of the O/S to the fastest NVM module; and assigning the HDD and the fastest NVM module as a logical hybrid drive of the computer system.

In an embodiment, the method may further include: copying a second portion of boot portions of the O/S to the second fastest NVM module; and assigning the second fastest NVM module to the logical hybrid drive of the computer system.

Determining the speed performance for each of the plurality of NVM modules may include carrying out a speed performance test. Carrying out the speed performance test may include: sending a performance checking pattern to the plurality of NVM modules; and receiving a speed performance test result for each of the plurality of NVM modules.

In an embodiment, determining the speed performance for each of the plurality of NVM modules may include detecting stored speed performance information and further include carrying out a speed performance test, and determining the speed performance based on results of the speed performance test.

Copying the first portion of boot portions of the O/S to the fastest NVM module may include: determining that the fastest NVM module has sufficient capacity to store an indivisible boot portion within the first portion. The first and second portions of boot portions of the O/S may have first and second sizes, respectively, in which case the method may further include, before copying the first portion of boot portions of the O/S to the fastest NVM module: defining the first and second sizes based on defined indivisible boot portions within the boot portions of the O/S.

The method may further include: detecting an NVM connection modification; and altering a logical hybrid drive definition based on the detected NVM connection modification.

Detecting the NVM connection modification may include detecting removal of the fastest NVM module or the second fastest NVM module, the fastest and second fastest NVM modules having boot portions of the O/S copied thereon. In such an embodiment, altering the logical hybrid drive definition may include, in relation to remaining NVM modules: copying the first portion of boot portions of the O/S to the fastest remaining NVM module; copying the second portion of boot portions of the O/S to the second fastest remaining NVM module; and assigning the HDD and the fastest and second fastest remaining NVM modules as a logical hybrid drive of the computer system.

Detecting the NVM connection modification may include detecting addition of an additional NVM module to create a new plurality of NVM modules. In such an embodiment, altering the logical hybrid drive definition may include: determining a speed performance the additional NVM module; copying the first portion of boot portions of the O/S to the fastest NVM module in the new plurality of NVM modules; copying the second portion of boot portions of the O/S to the second fastest NVM module in the new plurality of NVM modules; and assigning the HDD and the fastest NVM module and the second fastest NVM module in the new plurality of NVM modules as a logical hybrid drive of the computer system.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

FIG. 15 illustrates division of first and second boot portions of bootable O/S code taking into account an indivisible boot portion.

FIG. 16 illustrates an example of an NVM performance table generated according to an embodiment of the present disclosure.

DETAILED DESCRIPTION

Figure 1A:
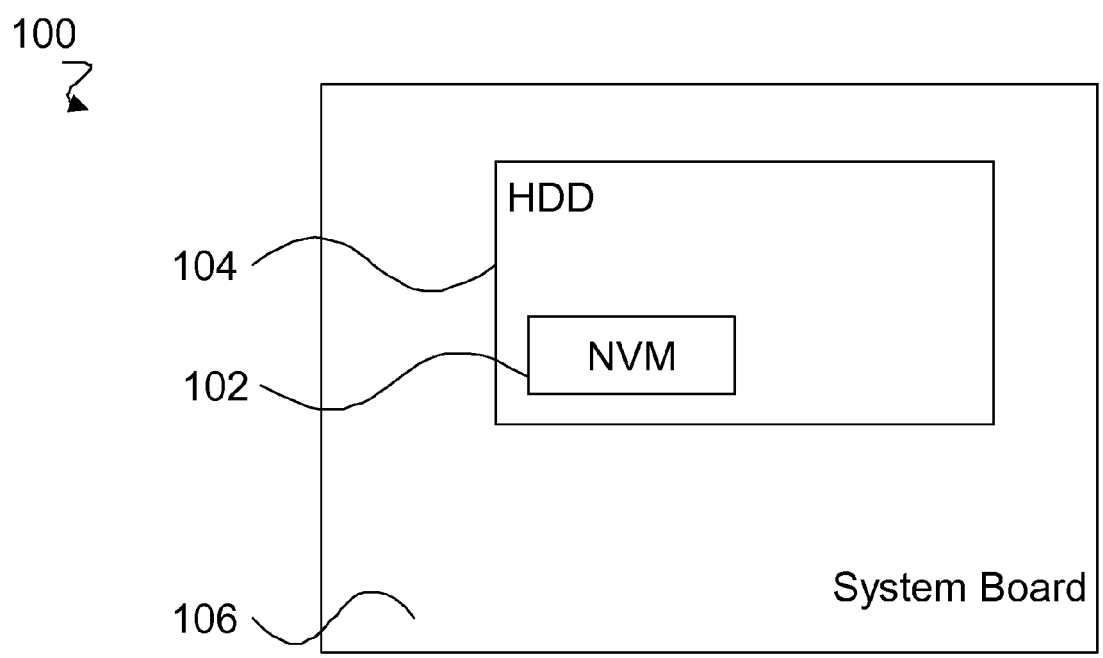
FIG. 1A and FIG. 1B illustrate known hybrid hard drive configurations.
Figure 1B:
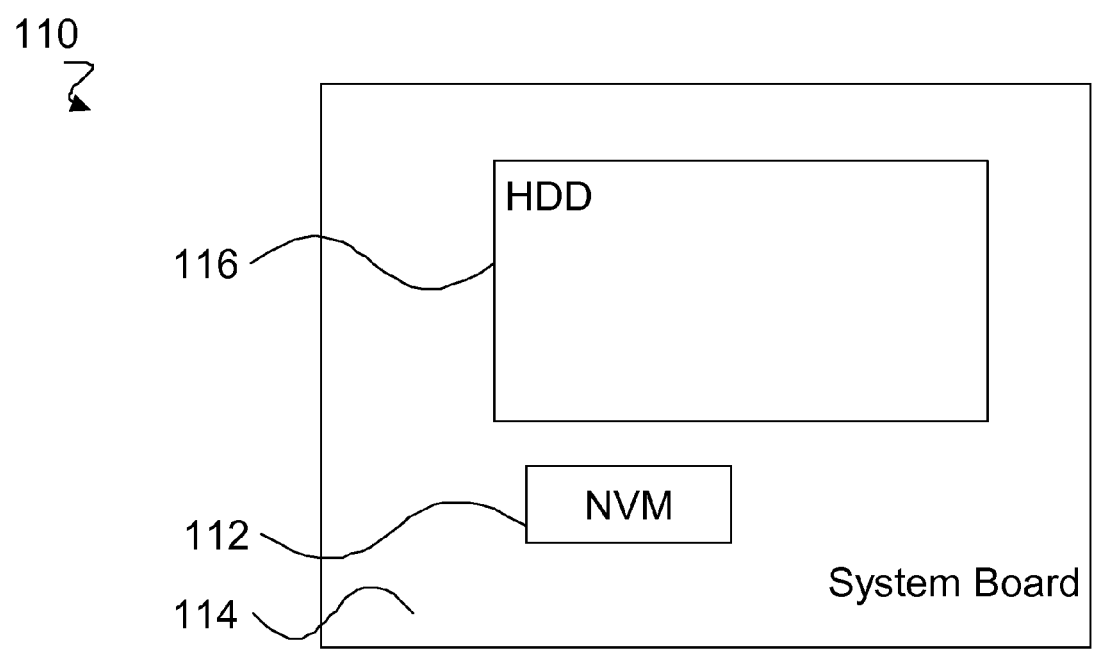

Generally, the disclosure provides a method of operating an NVM in either a hybrid drive mode or a normal storage mode, in response to a user selection. To operate in hybrid drive mode, a computer O/S and BIOS are preferably updated to identify the NVM as part of the same logical bootable disk, or logical hybrid drive, as an HDD. Bootable disk sector and address mapping can be modified to reflect the addition or removal of the NVM. The NVM is preferably user-replaceable and upgradeable without opening the computer's casing. When the NVM includes more than one NVM module, a first NVM module can operate in hybrid disk mode while a second NVM module operates in normal storage mode. Since no internal hardware modification is required, this approach can provide hybrid disk performance using conventional hardware, or to enhance performance of an existing hybrid drive.

In the following description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The term "non-volatile memory" as used herein represents a storage device whose contents are preserved when its power is off. In preferred embodiments, the non-volatile memory has very few, if any, moving parts, such as a solid-state electronic flash memory data storage device. Types of non-volatile memory include: mask-programmed ROM; programmable ROM (PROM); erasable PROM (EPROM), such as UV-erase EPROM and OTP (one-time programmable) ROM; electrically erasable PROM (EEPROM); flash memory; and battery-backed static RAM. Any multimedia card can be used, such as Smart Media, MultiMedia Card (MMC), Secure Digital (SD), extreme digital (xD), CompactFlash, Memory Stick, PCMCIA (Personal Computer Memory Card International Association), etc. Core memory typically consists of non-volatile cells, such as NAND-flash, NOR-flash, or other types of NV cells which are publicly released.

The term "BIOS" refers to software code run by a computer when it is first powered on. The BIOS prepares the computer so that other software programs stored on various media (such as hard drives, floppy drives, CDs, DVDs and other removable drives or removable media) can load, execute, and assume control of the computer. This process is known as booting up. BIOS can also be described as a coded program embedded on a chip that recognizes and controls various devices that make up the computer.

In the following description of embodiments of the present disclosure, the term "PC" is interchangeable with a computer system.

Figure 2A:
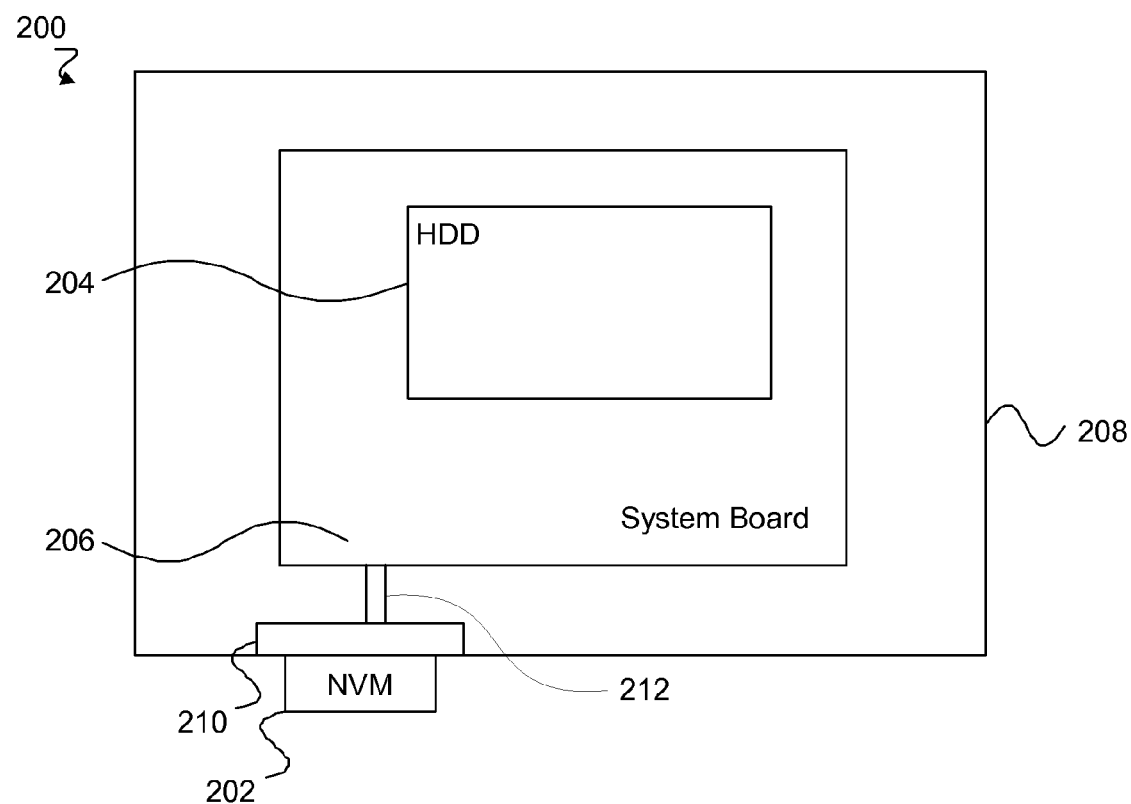
FIG. 2A illustrates a hybrid hard drive configuration according to an embodiment of the present disclosure.

FIG. 2A shows a hybrid hard drive configuration according to an embodiment of the present disclosure. Referring to FIG. 2A, a hybrid drive configuration 200 includes an NVM 202 as a non-volatile hybrid disk cache for an HDD 204. The configuration of FIG. 2A does not need to update or modify hardware internal to the computer system, such as inside a system's casing 208. According to embodiments of the present disclosure, O/S and BIOS updates are used to manage a non-volatile cache that is preferably installed via one or more receivers 210 for interfacing the NVM 202 with a system board 206. The receivers can advantageously be implemented as NVM slots 210, which are a popular element of personal computer (PC) systems. The NVM slots 210 can be provided as external slots installed on the front side of the PC casing 208, or as a portable memory card reader connected to a universal serial bus (USB) port of the computer. In either case, the NVM slots 210 are in electrical communication with the system board 206 via a standard interface connection 212.

The configuration of FIG. 2A is a cost effective solution that can be applied to existing computer systems without internal hardware modification, providing ability to add non-volatile cache to a system where it is not built in. The slots provided externally (rather than internally on the system board) also provide the user with the ability to upgrade or change the size of the memory, and also to easily change the mode (i.e. cache memory mode or regular storage memory mode), since the user does not need to open the computer's exterior casing. This is particularly beneficial with a mobile computer (also known as a portable, notebook or laptop computer), since it is generally not possible to open up a mobile computer's case without voiding its warranty.

Moreover, in the case where the system includes a card reader as a means to provide the NVM slots 210, this avoids the problems of having diverse form factors and pin compatibility of different memory card formats by providing several card slots to install the memory cards without hassles. Using such an interface, various memory cards can be used to provide non-volatile (NV) caching. The throughput speed of bus interface of memory cards is not limited by the bus performance. Generally, the bus performance is higher than the flash memory read and write (program) performance. Any suitable type of bus configuration can be used with embodiments of the present disclosure. In fact, any interface is acceptable if the transmission speed exceeds the hybrid disk element system requirement. One example is a Peripheral Component Interconnect (PCI)-type bus with a north bridge and south bridge configuration where memory card slots, such as provided by a reader, are connected to the south bridge via a USB connection. Since there are many bus standards and interfaces to receive external data from outside source to PC system, it is to be understood that FIG. 2 shows an exemplary configuration to illustrate how to communicate data between the hard disk and NV cards. The connection used for the memory card slots or reader is not limited by this diagram, but includes any connection that enables the use of an external NVM card in the role of NV caching for hard disk, preferably without requiring direct connection of the NVM to either the hard disk drive or the system board.

The computer system assigns the NVM and the HDD to a logical hybrid drive, such as a logical bootable disk, or defines the logical hybrid drive as including the NVM and the HDD. In order to make PC system recognize a memory card as a NV cache, a method according to an embodiment of the present disclosure preferably updates the O/S and the BIOS. In general, the BIOS should support bootable disk mode for removable disk (label name of flash memory card in PC system) and the O/S has the ability to allocate new address mapping with two disk elements (rotating hard disk and flash memory card). There are two primary ways to implement such a method: on a computer system with a pre-installed O/S; and on a computer system during installation of the O/S.

Figure 2B:
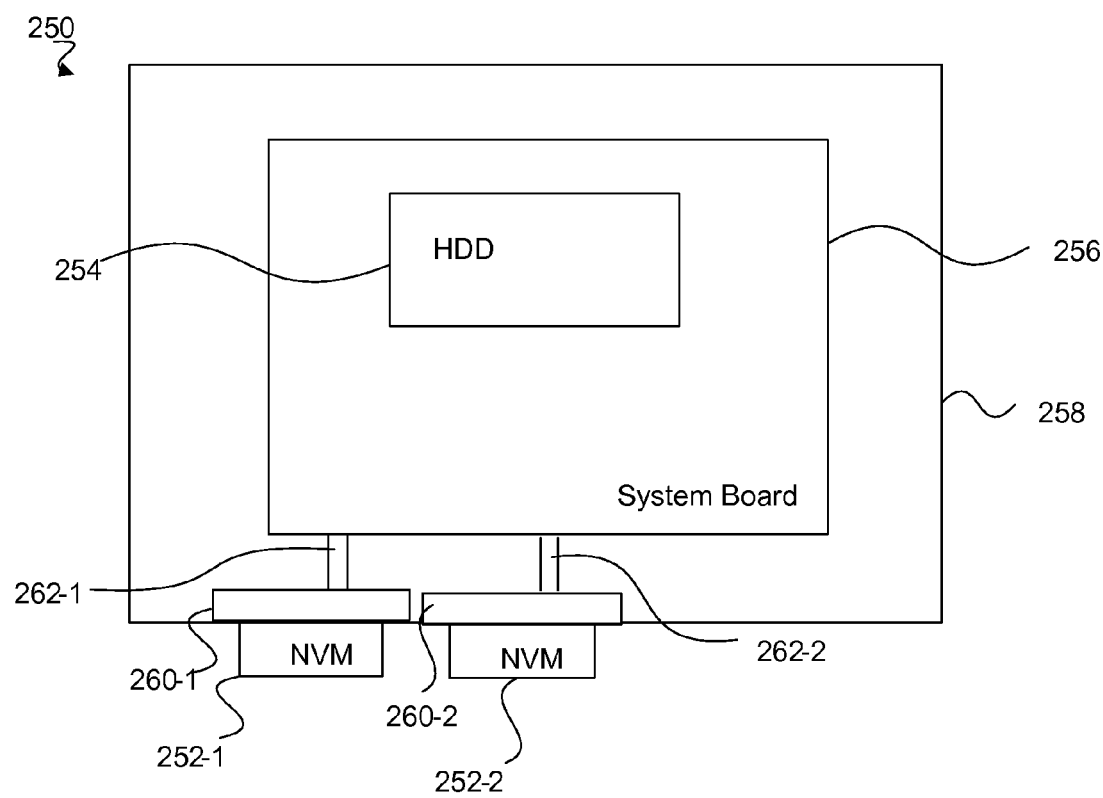
FIG. 2B illustrates a hybrid hard drive configuration according to another embodiment of the present disclosure.

FIG. 2B shows a hybrid hard drive configuration according to another embodiment of the present disclosure. Referring to FIG. 2B, a hybrid drive configuration 250 includes first and second NVM modules 252-1 and 252-2 as a non-volatile hybrid disk cache for an HDD 254. O/S and BIOS updates are used to manage the NVM modules 252-1 and 252-2 that are installed via first and second NVM slots 260-1 and 260-2. The NVM slots can be provided as external slots installed on the front side of the PC casing 258, or as a portable memory card reader connected to a USB port of the computer. In either case, the NVM slots 260-1 and 260-2 are in electrical communication with a system board 256 via first and second standard interface connections 262-1 and 262-2, respectively.

Figure 3:
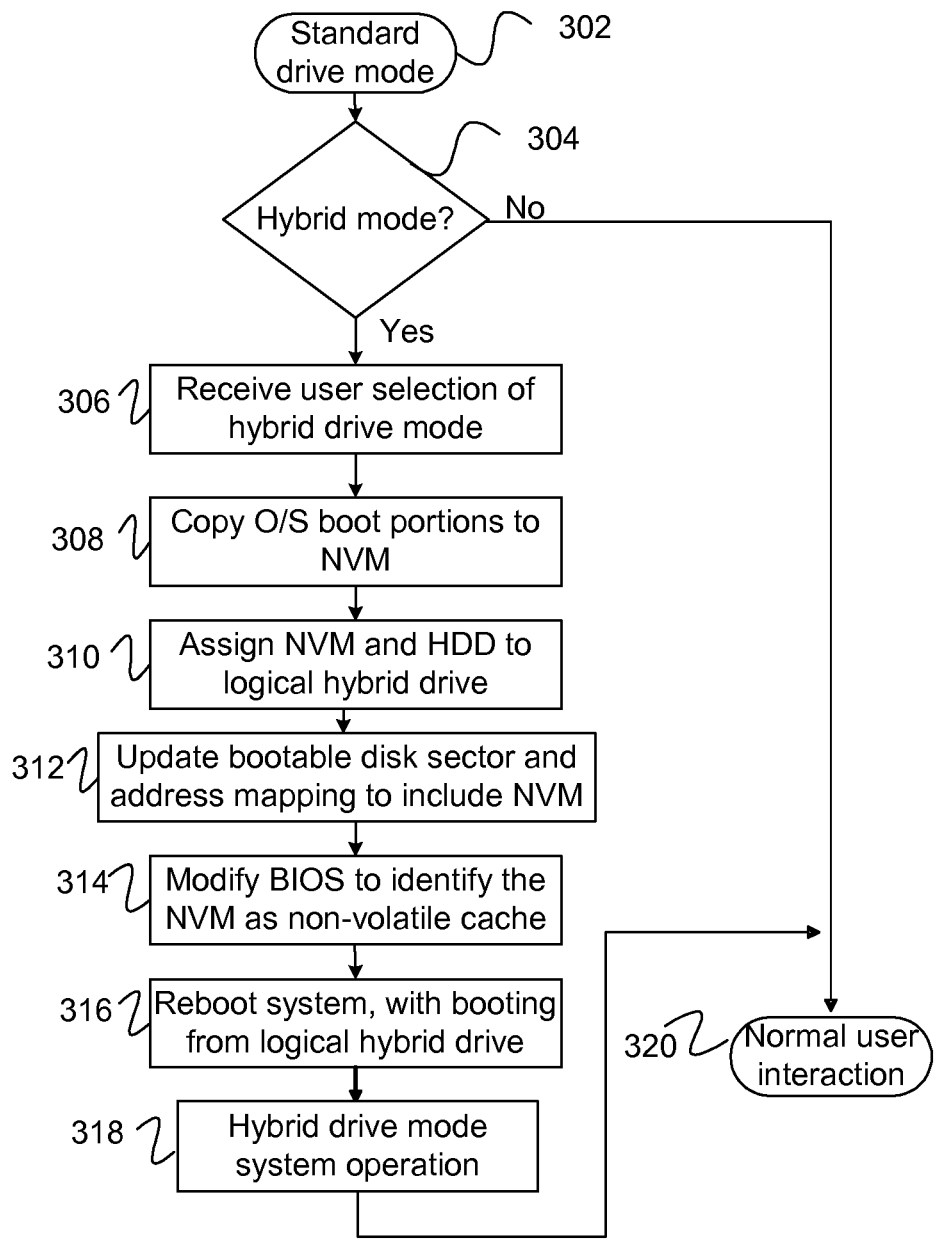
FIG. 3 illustrates a method of enabling a hybrid cache mode in a non-volatile memory according to an embodiment of the present disclosure.

FIG. 3 illustrates a method of enabling a hybrid cache mode in a non-volatile memory according to an embodiment of the present disclosure. Most PC users have pre-installed O/S PC systems when a manufacturer ships them to customers. So, one embodiment provides the ability to assign the bootable disk to be a single logical hybrid disk, even though the logical bootable disk includes two physically separate memory devices, namely the NVM and the HDD. FIG. 3 shows a method for implementation of a hybrid disk system by allocation of O/S file-transferring to the flash memory card.

Referring to FIGS. 2A and 3, step 302 represents the PC in standard drive mode. Standard drive mode is a mode in which the HDD 204 is not operating in hybrid mode, and the NVM 202 (if present) is operating in normal storage mode. The normal storage mode is characterized by storage of user data, and in many cases user-controlled data storage, such as storage of documents, media files, etc. Prior to entering standard drive mode, the following steps may have occurred, particularly upon system startup: checking bootable disks, system booting, reading the O/S from a rotating disk, and loading all required files from the rotating disk. Booting in step 302 is done from the rotating hard disk storing all O/S files because the PC system does not know what type of flash memory card is inserted into the one of slots and it is not yet prepared to use flash memory card as a non-volatile (NV) cache. Sometime prior to step 304, the NVM 202 is inserted in the system (e.g., the NVM slot 210), such as in a memory card slot, and is recognized as a removable disk. In the subsequent steps, the PC system is configured to use a hybrid disk system including rotating hard disk and flash memory card that a user preferably puts into a slot.

In step 304, the user selects the desired operational mode for the NVM 202. As mentioned previously, the O/S preferably supports a hybrid drive mode; alternatively the method can include an optional step (not shown) of updating the O/S to be able to support hybrid drive mode. Following step 306 in which the user selection or enabling of hybrid drive mode is received, in step 308 the PC system starts transferring the bootable O/S files, or O/S boot portions or O/S booting section, to the NVM, such as a flash memory card. In step 310, the NVM 202 and HDD 204 are assigned to the logical hybrid drive, or logical bootable disk. Steps 312 and 314 can be considered as falling within the scope of defining the logical hybrid drive, or logical bootable drive, to include the NVM 202 and the HDD 204.

In step 312, address mapping regarding disk sector and disk size are modified. The sector size and disk address allocation are preferably determined based on the size of flash memory card. In step 314, the BIOS is updated to identify the NVM 202 as the non-volatile HDD cache. Once these steps are complete, in step 316 the PC system can reboot from the logical hybrid drive, including the flash memory card as non-volatile HDD cache, and the computer system can operate in hybrid drive mode in step 318. Upon completion of the hybrid drive mode system operation in step 318 or non-hybrid mode (i.e., the negative determination in step 304), the PC enters a state of normal user interaction in step 320. Normal user interaction refers to the fact that there is no NVM configuration being performed, and the user interacts with the PC as per normal operation. In the case where the method flows from step 318 to step 320, this signifies termination of the NVM configuration, whereas NVM configuration never really began when proceeding from the negative determination in step 304.

In other words, in a broad aspect, the present disclosure provides a method of configuring an NVM in a computer system having a hard disk drive, an O/S and a BIOS. The method includes the following steps: receiving a user selection of a hybrid drive mode for the NVM; copying boot portions of the O/S to the NVM in response to the user selection; and assigning the hard disk drive (HDD) and the NVM to a logical hybrid drive of the computer system, or as a logical hybrid drive of the computer system. The NVM can be a non-volatile HDD cache. Advantageously, prior to the step of receiving the user selection, the method can further include configuring the NVM to operate in a normal storage mode. The step of assigning can include: assigning the HDD and the NVM to a logical hybrid bootable disk; modifying bootable disk sector and address mapping to include the NVM; or modifying the BIOS to identify the NVM as the non-volatile HDD cache. For example, in a case where the NVM includes first and second NVM modules, the method can further include: copying the boot portions of the O/S to the first NVM module and defining the logical hybrid drive to include the first NVM module, to operate the first NVM module in the hybrid drive mode; and operating the second NVM module in a normal storage mode while the first NVM module operates in the hybrid drive mode.

Figure 4:
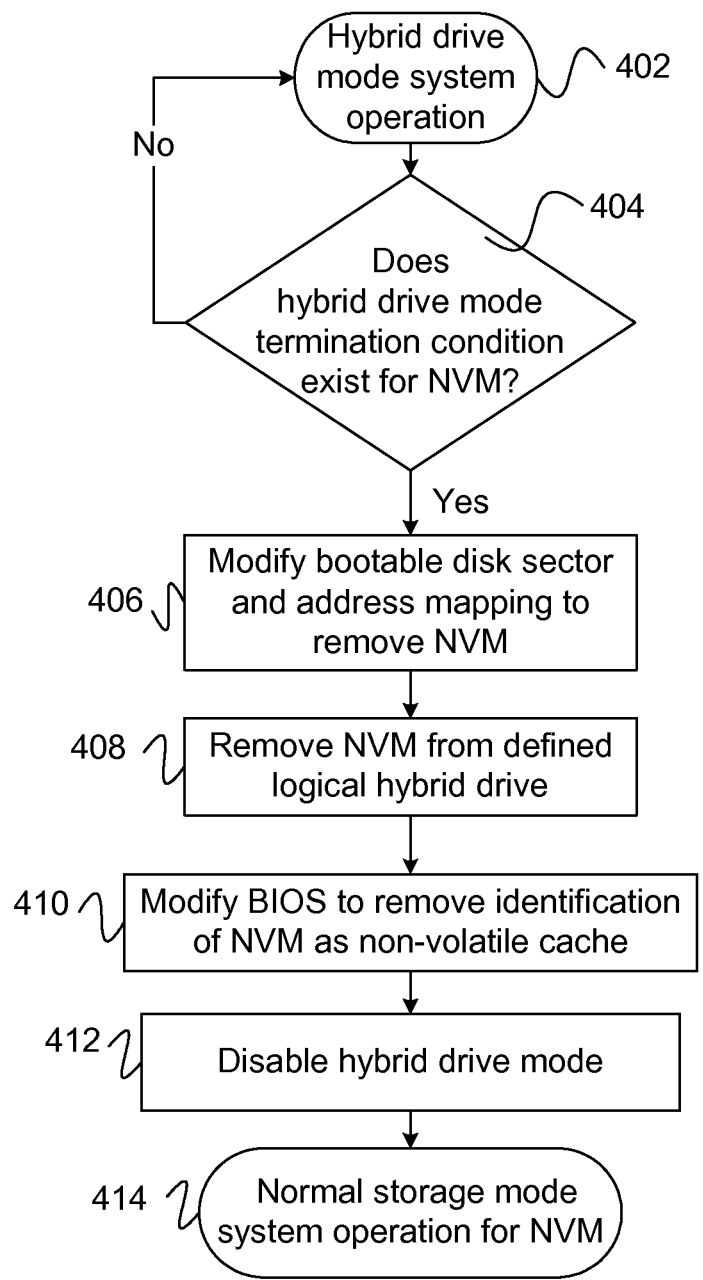
FIG. 4 illustrates a method of disabling or terminating a hybrid cache mode in a NVM according to an embodiment of the present disclosure.

FIG. 4 illustrates a method of disabling or terminating a hybrid cache mode in a non-volatile memory according to an embodiment of the present disclosure. Step 402 in FIG. 4 is similar to step 318 in FIG. 3 as it represents the system operating in hybrid drive mode.

Referring to FIGS. 2A and 4, in step 404, a determination is made as to whether a hybrid drive mode termination condition exists for the NVM 202. The hybrid drive mode termination condition can include: user selection of a normal storage mode for the NVM; removal, disconnection or ejection of the NVM 202. The system can monitor for hybrid mode termination conditions, either periodically or at particular times or events, or can rely on notification of a termination condition prior to disabling the hybrid drive mode. In step 406, the bootable disk sector and address mapping is modified to remove the NVM 202. In step 408, the NVM is removed from the defined (or assigned) logical hybrid drive. In step 410, the BIOS is modified to remove the identification of NVM 202 as non-volatile cache. In step 412, the hybrid drive mode is disabled. In step 414, the system returns to normal storage mode for the NVM and to non-hybrid mode for the HDD 204.

In other words, advantageously the hybrid drive mode can be disabled in response to a hybrid drive mode termination condition for the NVM, such as disconnection or removal of the NVM. After the step of disabling, the NVM can be removed from the defined logical hybrid drive, and the bootable disk sector and address mapping can be modified to remove the NVM. In a presently preferred embodiment including a memory card slot, the slot includes a securing means to prevent accidental disconnection of the memory card (such as unseating, removal, or ejection) from the computer system when the card is being used in hybrid drive mode. The securing means can be a hardware implementation, such as a latch.

Figure 5:
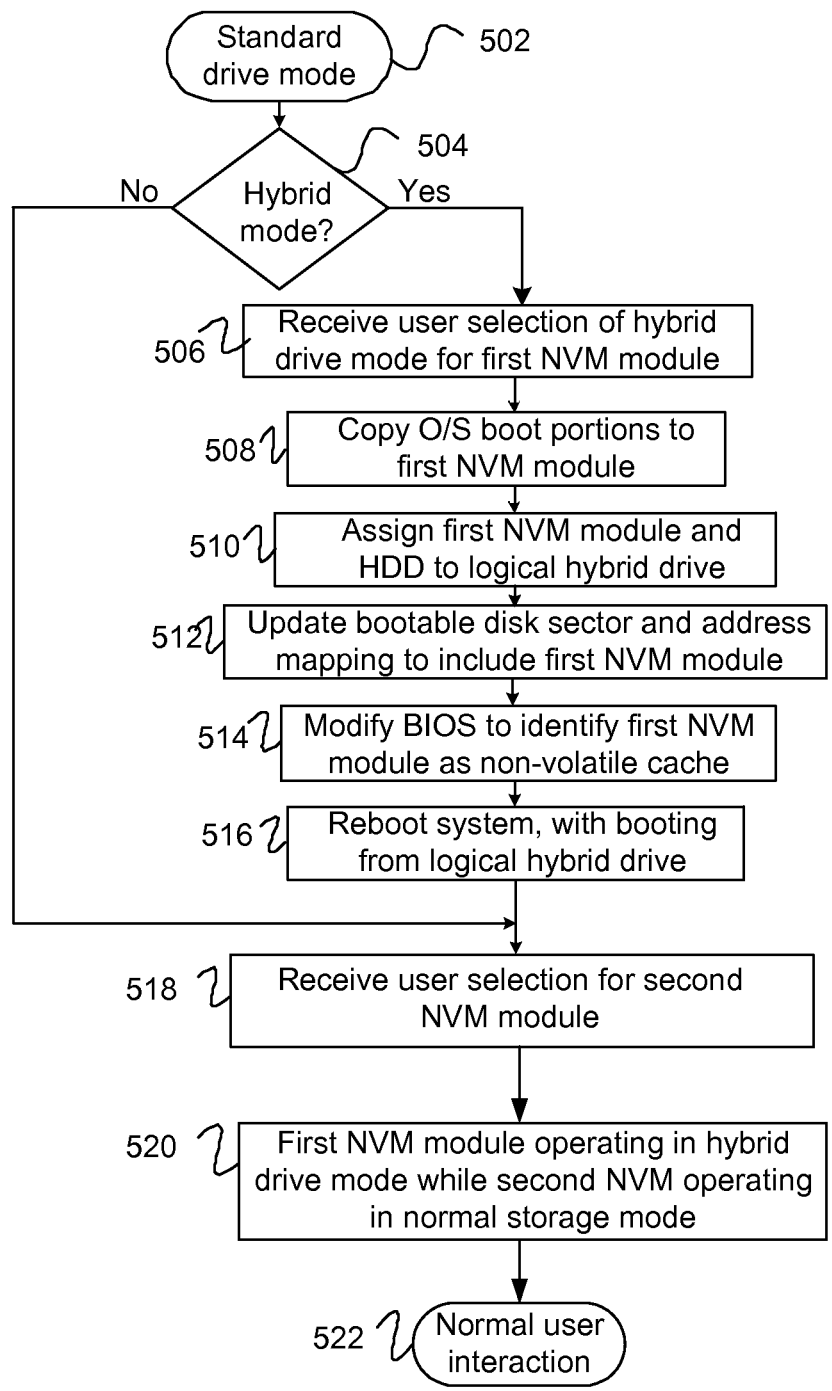
FIG. 5 illustrates a method of enabling a hybrid cache mode in a first NVM module while enabling a data storage in second NVM module according to an embodiment of the present disclosure.

FIG. 5 illustrates a method of enabling a hybrid cache mode in a first NVM module while enabling a data storage in second NVM module according to an embodiment of the present disclosure. Embodiments of the present disclosure support the use of a plurality of NVM modules, such as a plurality of flash memory cards, and the operation in hybrid mode in one NVM module, while another NVM module operates in a normal storage mode. When a user selects "hybrid mode" after booting PC system in normal mode, if there are already several flash memories are inserted in each slot, the user can select which one(s) is/are going to be used in hybrid drive mode. A drive name can be assigned with ease by an O/S supporting utility. The address mapping can vary depending on how many flash memories are involved in the hybrid disk system and the density of each flash memory card. More than one flash memory card can be used as a hybrid disk system and they do not have to be same type of flash card. Also, some NVMs can be used in hybrid mode while others are used in normal storage mode. In other words, the method enables concurrent operation of hybrid disk mode in a first NVM module and in normal storage mode in a second NVM module.

Referring to FIGS. 2B and 5, the method begins in step 502 with the system in standard drive mode, which was discussed in relation to FIG. 3. In step 504, a user selects the desired mode of operation for the NVM modules 252-1 and 252-2, which in this case includes selecting hybrid drive mode for the first NVM module 252-1 and normal storage mode for the second NVM module 252-2. Steps 506-516 are similar to steps 306-316 in FIG. 3, with the operations being performed in relation to the first NVM module 252-1. Upon completion of step 516, the system receives a user selection of data storage for the second NVM module 252-2 in step 518. The second NVM module 252-2 is set to operate in normal storage mode, typically including recognition by the O/S of the second NVM module 252-2 as a removable disk. Thereafter, the first NVM module 252-1 operates in hybrid drive mode (along with the HDD as part of the logical hybrid drive), while the second NVM module 252-2 operates in a normal storage mode, in step 520. Upon completion of the hybrid drive mode system operation in step 520 or non-hybrid mode (i.e., the negative determination in step 504, which is effectively a selection of normal storage mode), the PC enters a state of normal user interaction in step 522. Alternatively, step 518 can be performed before step 516, and even before step 506. Effectively, if a hybrid drive mode is not selected, that effective selection is stored and can be acted on at any suitable time. For example, step 518 can represent acting on a previously received selection.

While a method according to an embodiment of the present disclosure has been described in relation to a system in which an O/S has been pre-installed, it is to be understood that a similar method can be applied during O/S installation to a system on which the O/S has not yet been installed.

Figure 6:
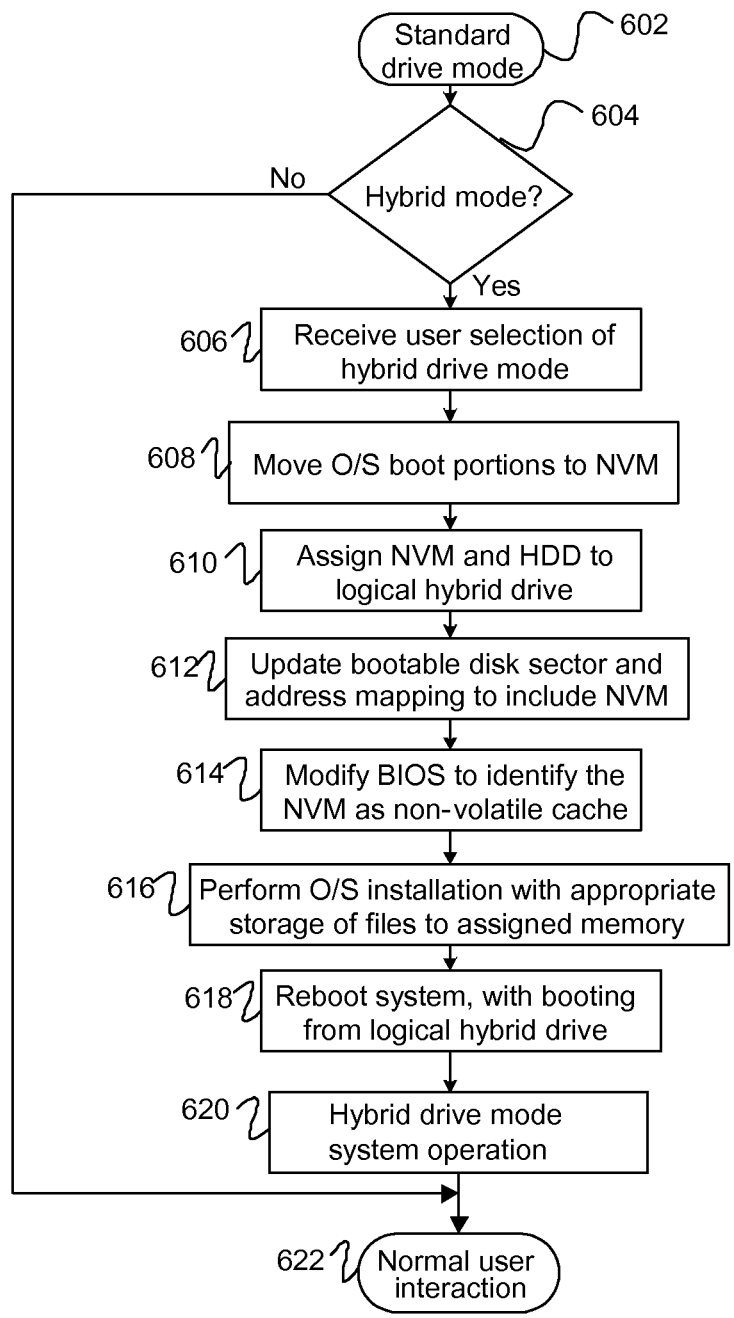
FIG. 6 illustrates a method of enabling a hybrid cache mode in a non-volatile memory upon operating system installation according to an embodiment of the present disclosure.

FIG. 6 illustrates a method of enabling a hybrid cache mode in a non-volatile memory upon operating system installation according to an embodiment of the present disclosure. Referring to FIG. 6, the standard drive mode in step 602 includes reading the O/S from a bootable disk (such as a CD or DVD). The user selection step 604 is then performed during preparation for initial O/S installation, so that all required files are installed to the HDD and NVM from the beginning. The NVM has to be inserted or physically installed prior to the user selection step. Steps 606-614 are similar to steps 306-314 of FIG. 3, but in step 608 the boot portions of the O/S are moved to the NVM and a copy is not left on the HDD. In this embodiment, in step 616 the O/S installation is performed from start to completion, with appropriate storage of files to the assigned memory. Upon completion of step 616, steps 618 and 620 are executed, which are similar to steps 316 and 318 of FIG. 3. Upon completion of the hybrid drive mode system operation in step 620 or non-hybrid mode (i.e., the negative determination in step 604), the PC enters a state of normal user interaction in step 622. The method shown in FIG. 6 can be implemented in the hybrid hard drive configurations shown in FIGS. 2A and 2B.

In relation to FIG. 6, the selection of "hybrid mode" is therefore performed once upon user selection, and the PC system demands the NVM in order to boot PC system, since it can no longer boot from the hard disk drive. If one NVM is not enough for the hybrid mode, a second NVM can be used as a data storage. If the flash memory card is changed, the O/S should be re-installed in order to: recognize the density of the flash memory card and restore bootable O/S parts; or restore bootable codes to the rotating hard disk. This embodiment provides more free space in the rotating hard disk drive, but, the flexible selection between normal mode and hybrid disk mode is not supported, resulting in a dedicated flash memory card for PC booting.

FIGS. 7A-7F illustrate allocation of bootable operating system codes, or boot portions of the O/S, in a non-volatile memory and in a hard disk drive according to embodiments of the present disclosure.

Figure 7A:
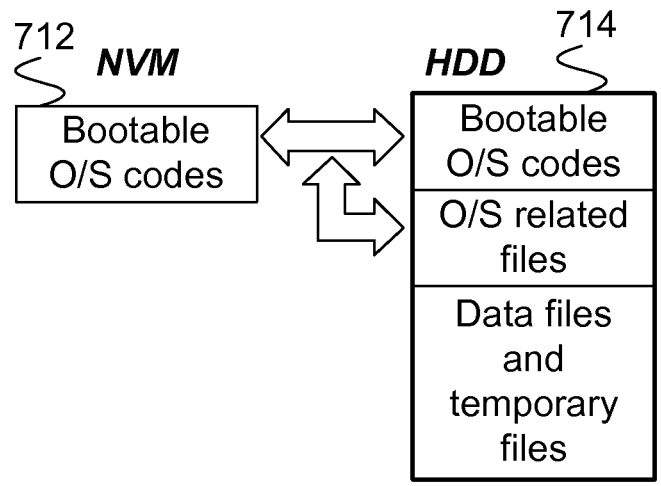
FIGS. 7A, 7B, 7C, 7D, 7E and 7F illustrate allocation of bootable operating system codes, or boot portions of the O/S, in a non-volatile memory and in a hard disk drive according to embodiments of the present disclosure.
Figure 7B:
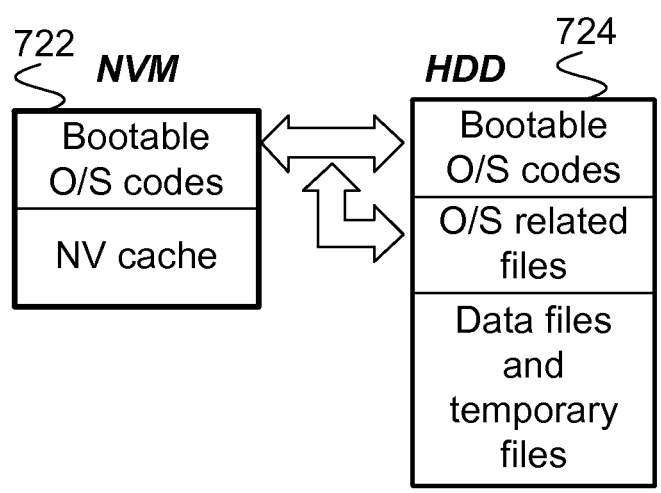

Referring to FIG. 7A, a non-volatile memory (NVM) 712 only has sufficient capacity to store the bootable O/S codes, and is in communication with a rotating hard disk drive (HDD) 714, which still stores the bootable O/S codes and other O/S related files. Referring to FIG. 7B, an NVM 722 has sufficient capacity to store the bootable O/S codes as well as to have a portion of its memory assigned as non-volatile cache, as part of a hybrid hard disk. An HDD 724 stores similar data as the HDD 714 in FIG. 7A. FIGS. 7A and 7B illustrate NVM and HDD data allocation subsequent to the method of FIG. 3, in which case hybrid drive mode can be disabled without reinstalling the O/S.

Figure 7C:
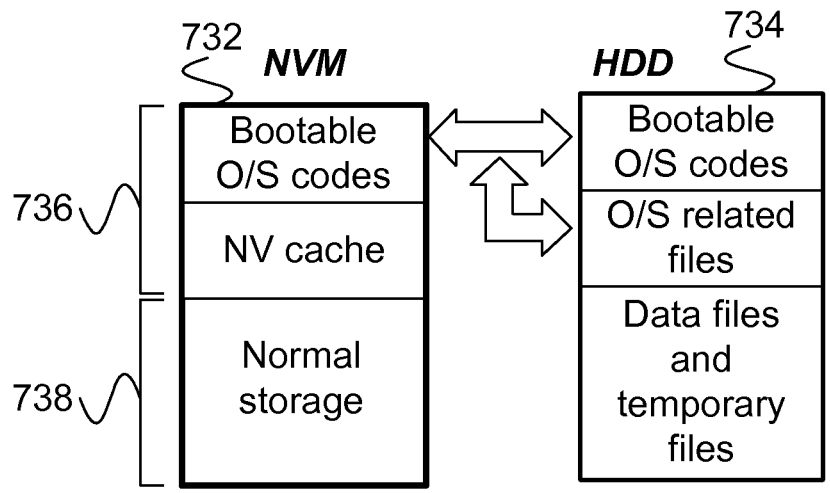

Referring to FIG. 7C, an NVM 732 has sufficient capacity to store the bootable O/S codes, act as non-volatile cache, and act as additional storage in normal storage mode. The NVM 732 is in communication with the HDD 734, which still stores the bootable O/S codes and other O/S related files. The NVM 732 in FIG. 7C is advantageously a high capacity NVM, which can be logically separated into a first sub-block, or first logical NVM module, 736 and a second sub-block, or second logical NVM module, 738. The first logical NVM module 736 can operate in a hybrid drive mode while the second logical NVM module 738 concurrently operates in a normal storage mode. This is similar in nature to the concurrent operation of two physically separate NVMs in differing modes, but in this example the two NVMs are not physical NVMs but are logically defined NVMs that are part of the same physical NVM. A logically defined NVM, or logical NVM module, can include, or be spread over, one or more physical NVMs.

Figure 7D:
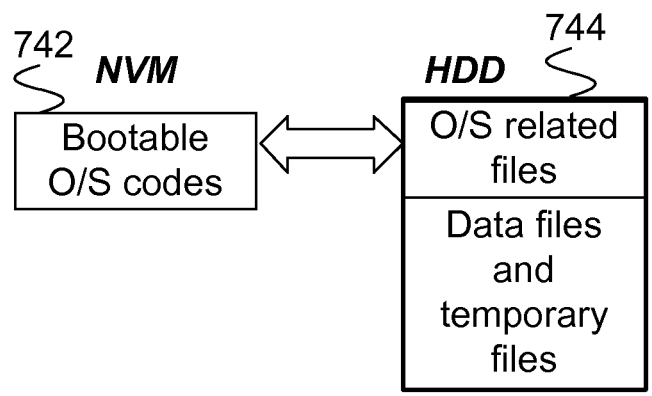
Figure 7E:
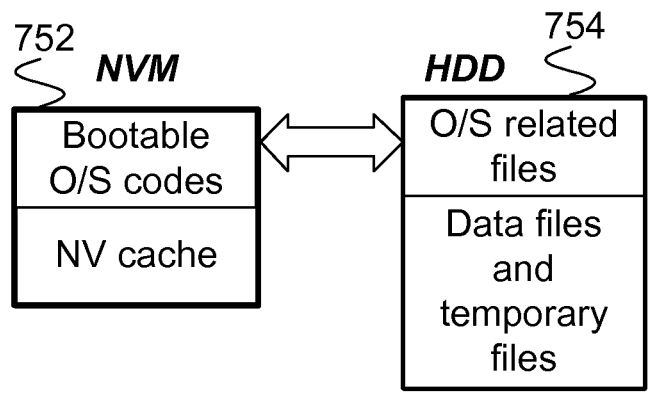

FIGS. 7D and 7E illustrate NVM and HDD data allocation subsequent to FIG. 6, after which booting is only performed via the NVM, unless the O/S is reinstalled. In FIGS. 7A and 76, the rotating HDDs 714 and 724 retain the bootable O/S codes in order to permit switching the NVM between hybrid drive mode and normal storage mode without reinstallation of the O/S. Referring to FIGS. 7D and 7E, HDDs 744 and 754 do not retain the bootable O/S codes, so switching the NVM to a normal storage mode requires reinstallation of the O/S on the hard disk drive. NVMs 742 and 752 store similar data as the NVMs 712 and 722, respectively.

Figure 7F:
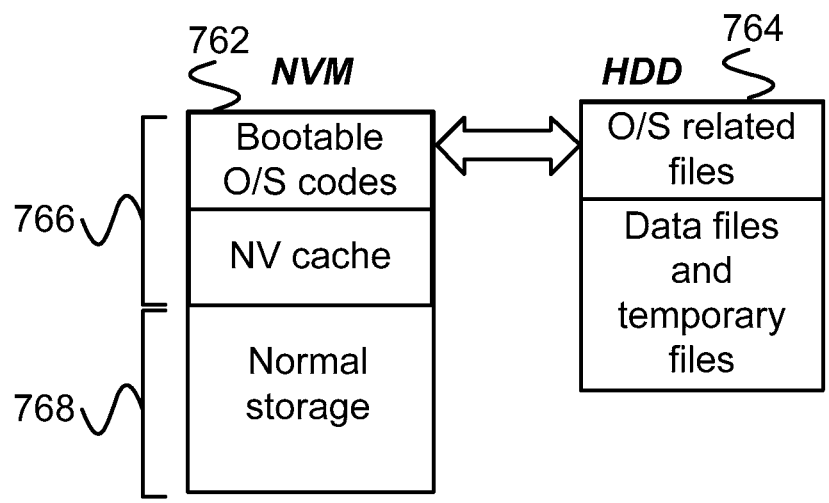

Referring to FIG. 7F, an NVM 762 has sufficient capacity to store the bootable O/S codes, act as non-volatile cache, and act as additional storage in normal storage mode. The NVM 762 is in communication with the HDD 764, which is similar to the HDD 734 of FIG. 7C. The NVM 762 is similar to the NVM 732 in FIG. 7C in that it is advantageously a high capacity NVM, which can be logically separated into a first logical NVM module 766 and a second logical NVM module 768.

As mentioned in relation to FIG. 4, embodiments of the present disclosure provide the ability to use a plurality of memory cards in hybrid disk mode and/or normal storage mode. For example, a plurality of flash memory cards can be used in hybrid disk mode. In another example, if there are two flash memory cards in a PC system, one can be used in hybrid disk mode, while the other is used in normal storage mode.

Figure 8:
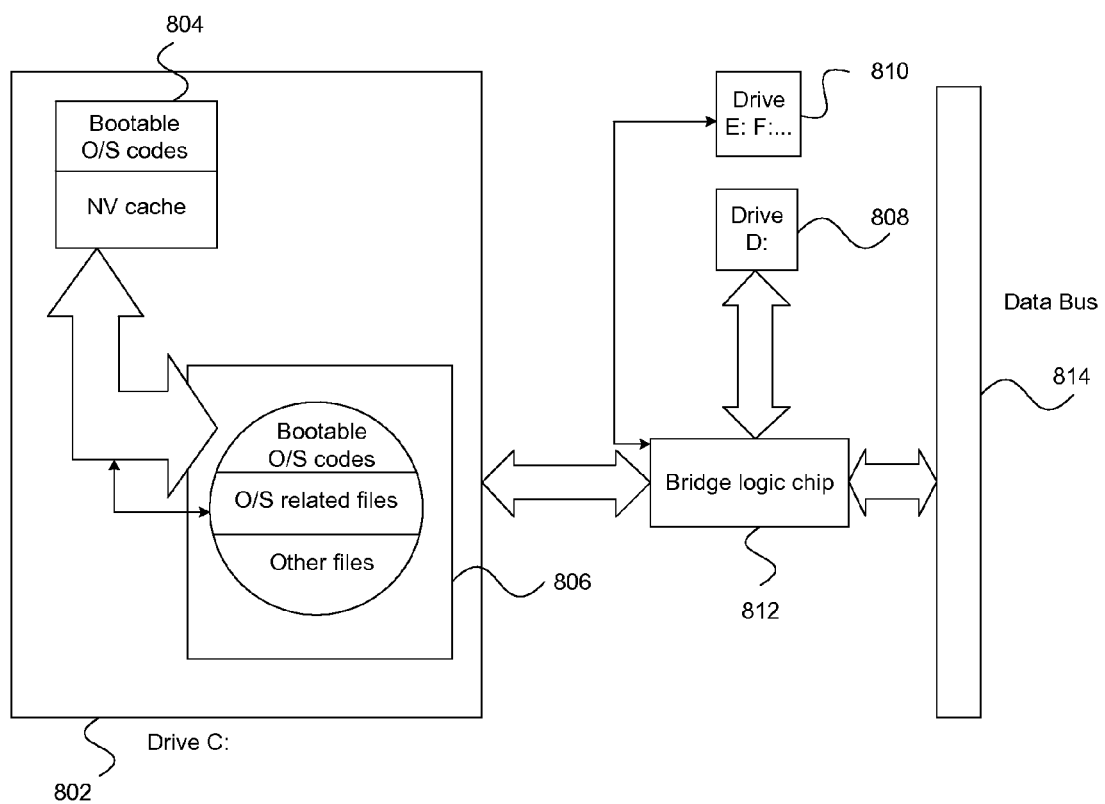
FIGS. 8, 9 and 10 illustrate disk assignment after enabling a hybrid cache mode in a non-volatile memory according to embodiments of the present disclosure.
Figure 9:
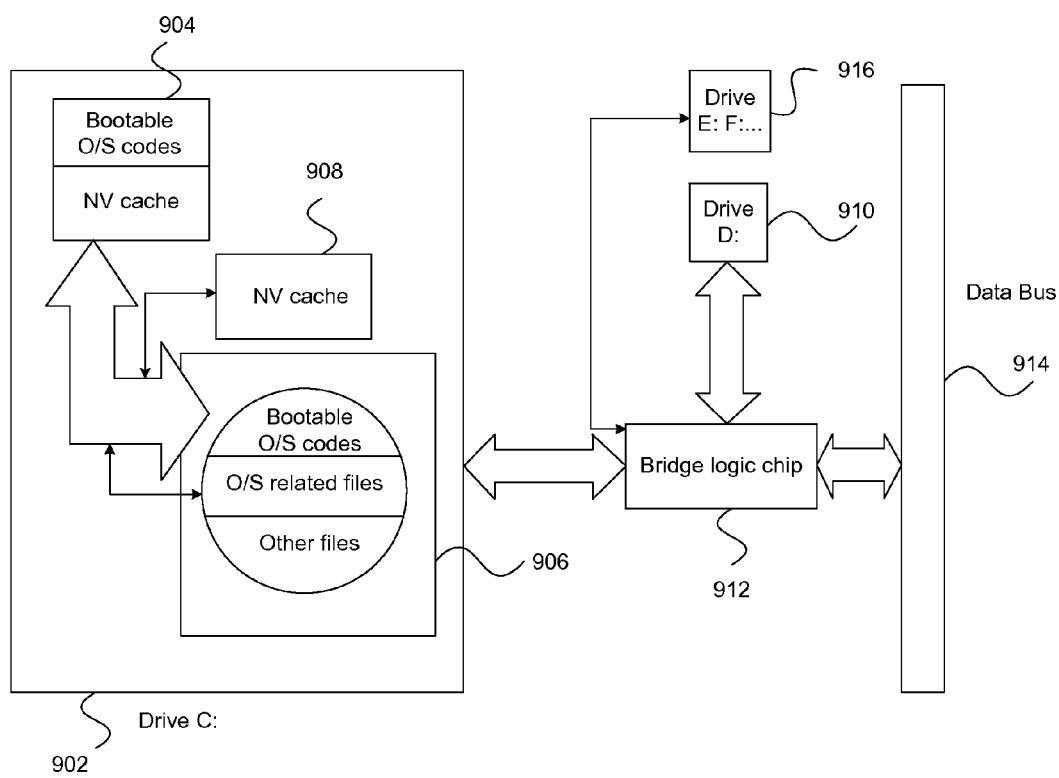
Figure 10:
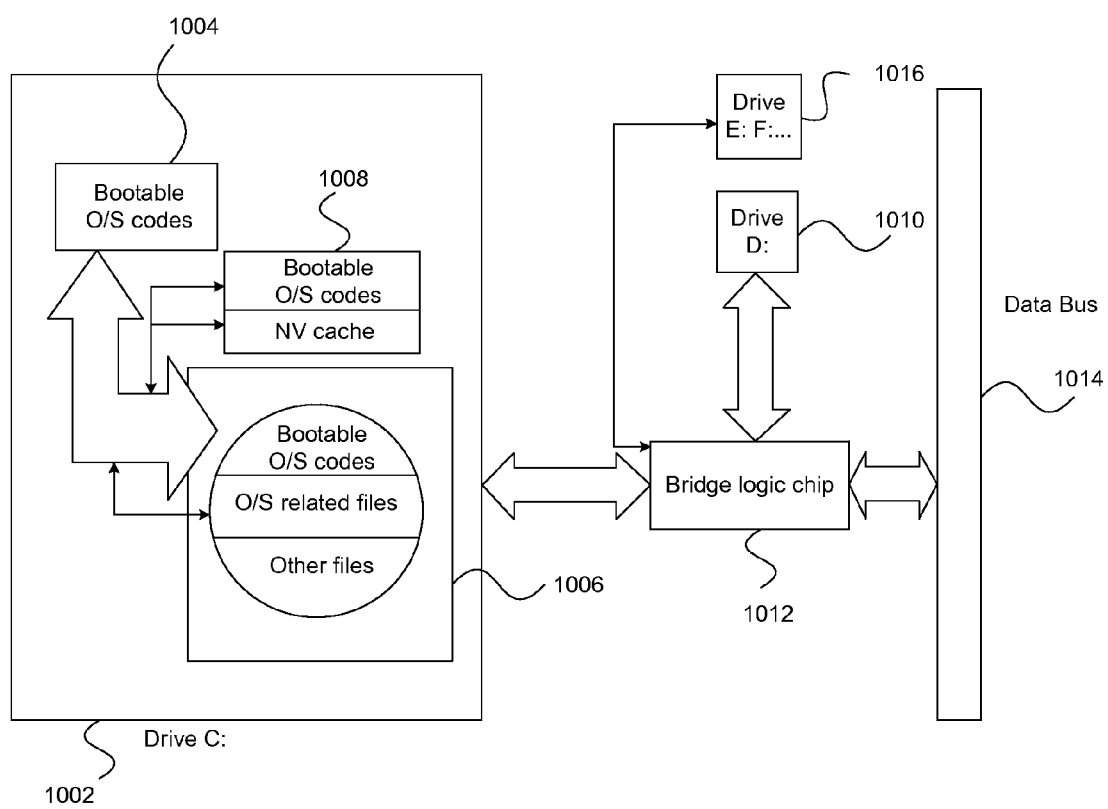

FIGS. 8-10 illustrate disk assignment after enabling a hybrid cache mode in a non-volatile memory according to embodiments of the present disclosure, in particular considering cases where a plurality of flash memory cards can be used.

Referring to FIG. 8 a hybrid drive 802 includes an NVM 804, such as a flash memory card, with high memory capacity that can comprise both bootable O/S codes and NV cache space. This high capacity NVM 804 is defined to be part of the logical bootable disk, "Drive C:", along with an HDD 806. Other NVMs 808 for "Drive D:" and 810 for "Drive E: F: . . . " are shown to be operable in normal storage mode. A bridge logic chip 812 facilitates communication between the hybrid drive 802 and the other NVMs 808 and 810, as well as between the hybrid drive 802 and the data bus 814, such as a PCI bus.

Referring to FIG. 9, a hybrid drive 902 includes two NVM modules 904 and 908 as well as an HDD 906. As such, two NVM modules are used in hybrid drive mode and both are defined to be part of the logical bootable disk. For example, one Compact Flash NVM and one SD NVM can be used, illustrating that it is not necessary to have similar formats of NVM for the same function. Other NVMs 910 and 916 operate in normal storage mode while the NVM modules 904 and 908 operate in hybrid drive mode. A bridge logic chip 912 acts as an interface between hybrid drive 902 and NVMs 910 and 916, and data bus 914 for the communication of data between these elements.

FIG. 10 depicts an example of a single NVM that does not have the capacity to store all bootable O/S codes. Referring to FIG. 10, a hybrid drive 1002 includes two NVM modules 1004 and 1008 as well as an HDD 1006. In this case, the NVM module 1004 stores a first portion of the boot portions of the O/S, and the NVM module 1008 stores a second portion of the boot portions of the O/S, and also includes space to act as NV cache. A bridge logic chip 1012 and a data bus 1014 are similar to the bridge logic chip 812 and data bus 814 of FIG. 8. Also, other NVM modules 1010 and 1016 operate in a same manner as the NVM modules 904 and 908 of FIG. 9.

As illustrated in FIGS. 8-10, embodiments of the present disclosure can include different block mapping for bootable disk elements. In each case, there is a relationship between the functional role, logical mapping and physical elements. While in some instances each physical element can have a distinct logical mapping and functional role, each functional role can be divided between a plurality of physical elements, as described above, or there can be any combination of functional roles and logical mapping with one or more physical elements.

In other words, in an aspect the present disclosure provides a computer system including an HDD, NVM, an O/S and a BIOS. The computer system includes a machine-readable medium storing commands and instructions which, when executed, cause a processor to perform a method of configuring a non-volatile memory. The method includes: receiving a user selection of a hybrid drive mode for the NVM; copying boot portions of the O/S to the NVM in response to the user selection; and assigning the hard disk drive and the NVM to a logical hybrid drive of the computer system, or as a logical hybrid drive of the computer system. The NVM can be a non-volatile HDD cache.

Advantageously, the NVM can be removable and replaceable without performing an internal computer system hardware upgrade. The NVM can be a flash memory card. The computer system can further include a receiver for receiving the NVM, the receiver being in electrical communication with the processor. The receiver can be a slot for receiving the NVM, which is accessible by a user without opening the outer casing. The slot can include a securing means to prevent disconnection of the NVM when the NVM is being used in hybrid drive mode. For example, in the case where the NVM includes first and second NVM modules, the first NVM module can include the boot portions of the O/S and the logical hybrid drive is defined to include the first NVM module; the first NVM module being operable in the hybrid drive mode. The second NVM module is operable in a normal storage mode while the first NVM module is operable in the hybrid drive mode. The first and second NVM modules can be logical NVM modules or physical NVM modules.

As mentioned earlier, software (and possibly hardware) for implementing embodiments of the present disclosure can be provided as an upgrade kit or add-on module for an existing computer system, requiring no internal hardware upgrade. Many users may already have a multi-format card reader that accepts different types of non-volatile memory, and even have some memory cards that are presently used with other electronic devices, such as digital cameras or personal digital assistants (PDAs). In that case, the user need only acquire the software upgrade to provide the ability to use the memory in either a hybrid disk mode or a normal storage mode. The software upgrade can be provided on a computer-readable, or machine-readable, medium.

Therefore, in another aspect, the present disclosure provides a machine-readable medium storing commands and instructions which, when executed, cause a processor to perform a method of configuring an NVM in a computer system having an HDD, an O/S and a BIOS. The method includes: receiving a user selection of a hybrid drive mode for the NVM; copying boot portions of the O/S to the NVM in response to the user selection; and assigning the hard disk drive and the NVM to a logical hybrid drive of the computer system, or as a logical hybrid drive of the computer system. The commands and instructions stored on the machine-readable medium can perform other steps in the method, as described earlier.

Figure 11:
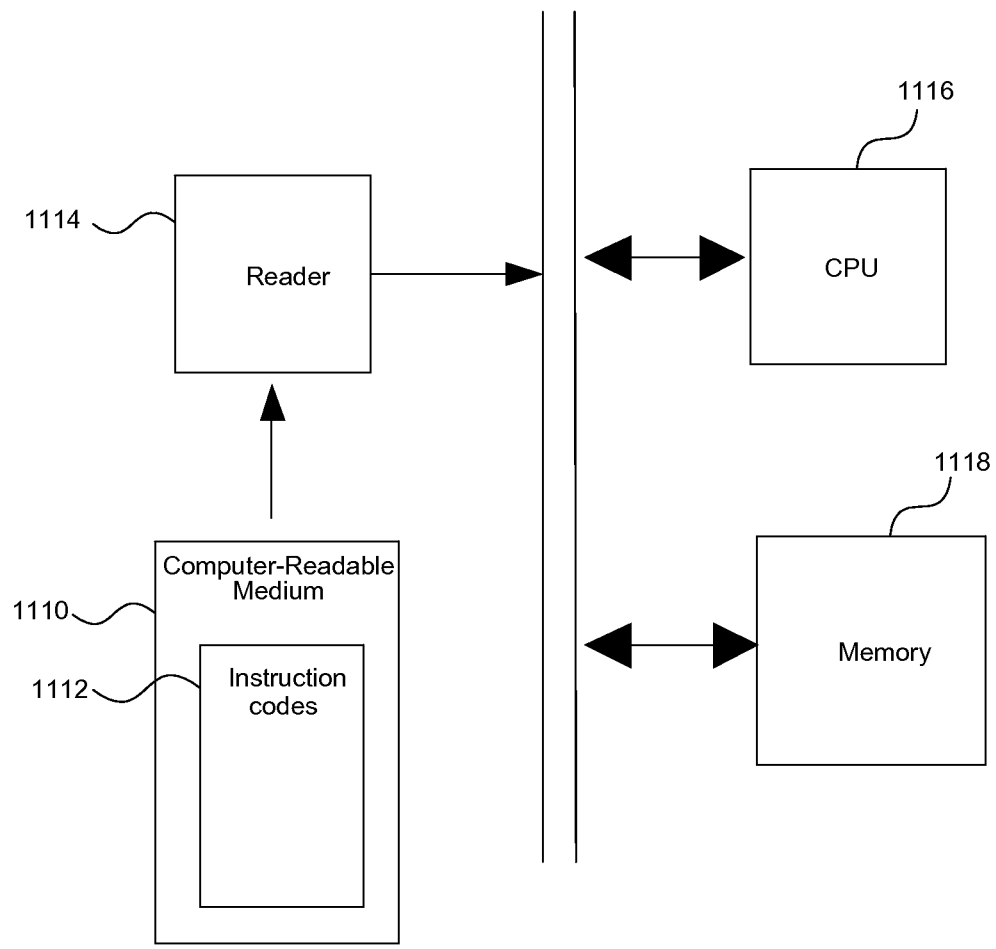
FIG. 11 illustrates a machine-readable medium storing commands and instructions according to an embodiment of the present disclosure.

FIG. 11 shows a machine-readable medium storing commands and instructions according to an embodiment of the present disclosure. Referring to FIG. 11, a computer-readable medium 1110 containing instruction codes is provided to a reader 1114 of a computer system. The reader 1114 reads the instruction codes 1112 and the read codes are provided to a CPU 1116 of the computer system. The CPU 1116 processes the read codes and the processed codes are stored in a memory 1118 (e.g., a hard disk) of the computer system. The CPU 1116 reads the stored codes and their instructions are executed, so that the CPU 1116 performs operations defined by the instruction codes 1112. In a case where the instruction codes 1112 contained in the computer-readable medium 1110 defines a method of configuring an NVM (not shown) in a computer system as described earlier, the CPU 1116 performs to execute the method for configuring the NVM.

In a further aspect, the present disclosure provides a non-volatile memory device operable in a hybrid disk mode or a normal storage mode in response to a user mode selection.

When considering different NVM modules that can be used in a hybrid drive mode, embodiments described thus far have considered the capacity or density of the NVM. There are also a number of available NVM form factors, such as: Compact Flash (CF); Secure Disk Card (SD card); Multi Media Card (MMC); Universal Serial Bus (USB) flash drive; Memory Stick; and variants of each of these form factors. A reader of ordinary skill in the art will be generally familiar with differences between such NVM form factors and their respective advantages and disadvantages.

Many of the available NVM form factors have different performance grades. Even two NVMs having the same form factor can have different write/read performance caused by internal NVM characteristics and interface operating speed. Though two NVM modules can have the same NVM cells, their performance and form factor are not necessarily identical to each other. For different form factors, most systems have an external connector or reader to detect all of attached NVM devices. However, such a system does not check and compare to determine the NVM with the best performance of all linked NVM devices. Embodiments of the present disclosure will now be described in which the fastest NVM modules connected to the system are identified for use in a hybrid drive mode.

For example, in an embodiment, in response to a user selection of a hybrid drive mode for the NVM, the plurality of NVM modules can be ranked according to speed performance. Boot portions of the O/S are copied to a highly ranked NVM module, or a plurality of highly ranked NVM modules, and the HDD and the highly ranked NVM modules are assigned as a logical hybrid drive of the computer system. Ranking each of the plurality of NVM modules can include carrying out a speed performance test. This approach can provide hybrid disk performance using conventional hardware, or enhance performance of an existing hybrid drive, while taking into account relative performance of available NVM modules.

Figure 12A:
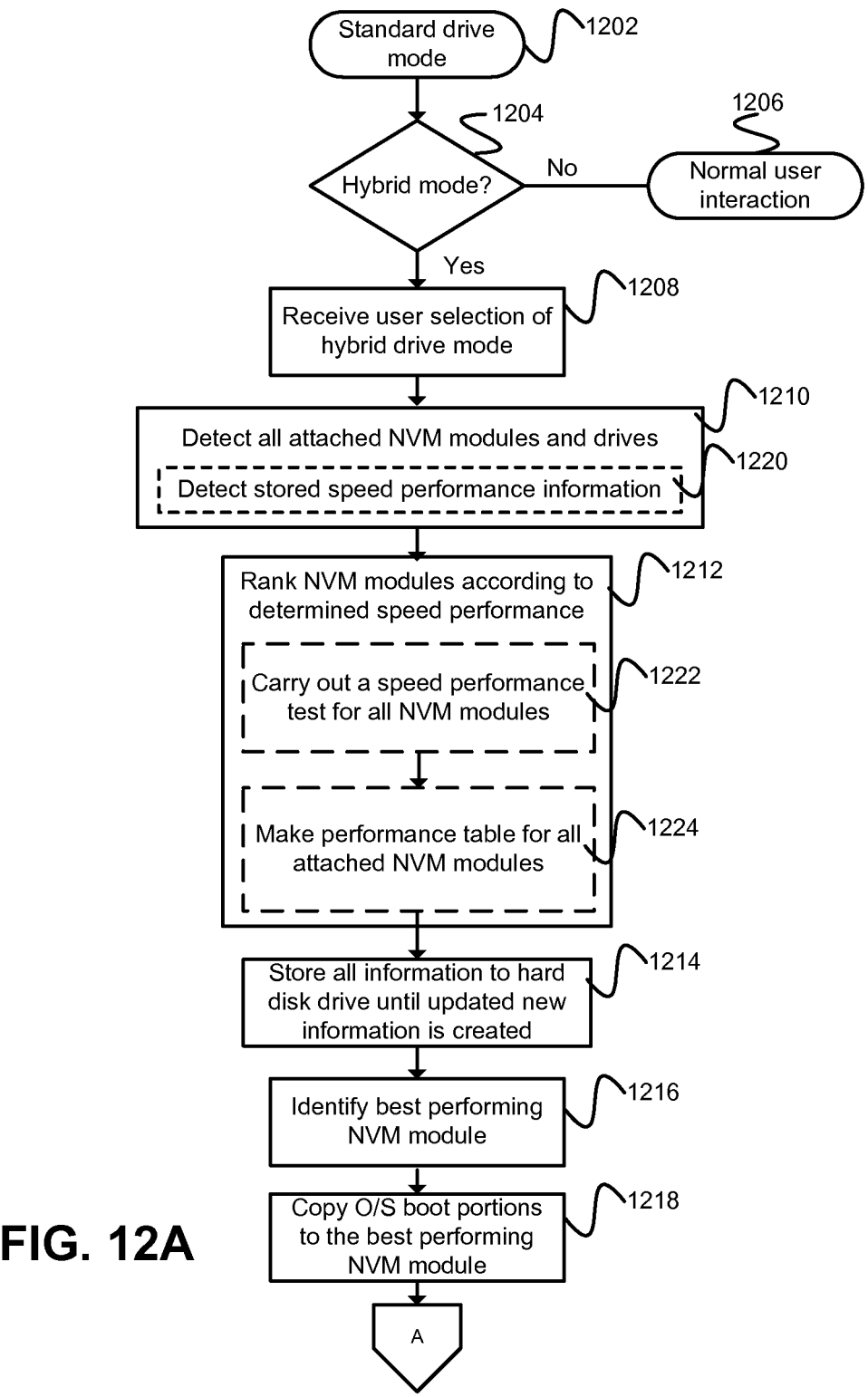
FIGS. 12A and 12B illustrate a method of enabling a hybrid cache mode in a non-volatile memory according to another embodiment of the present disclosure.
Figure 12B:
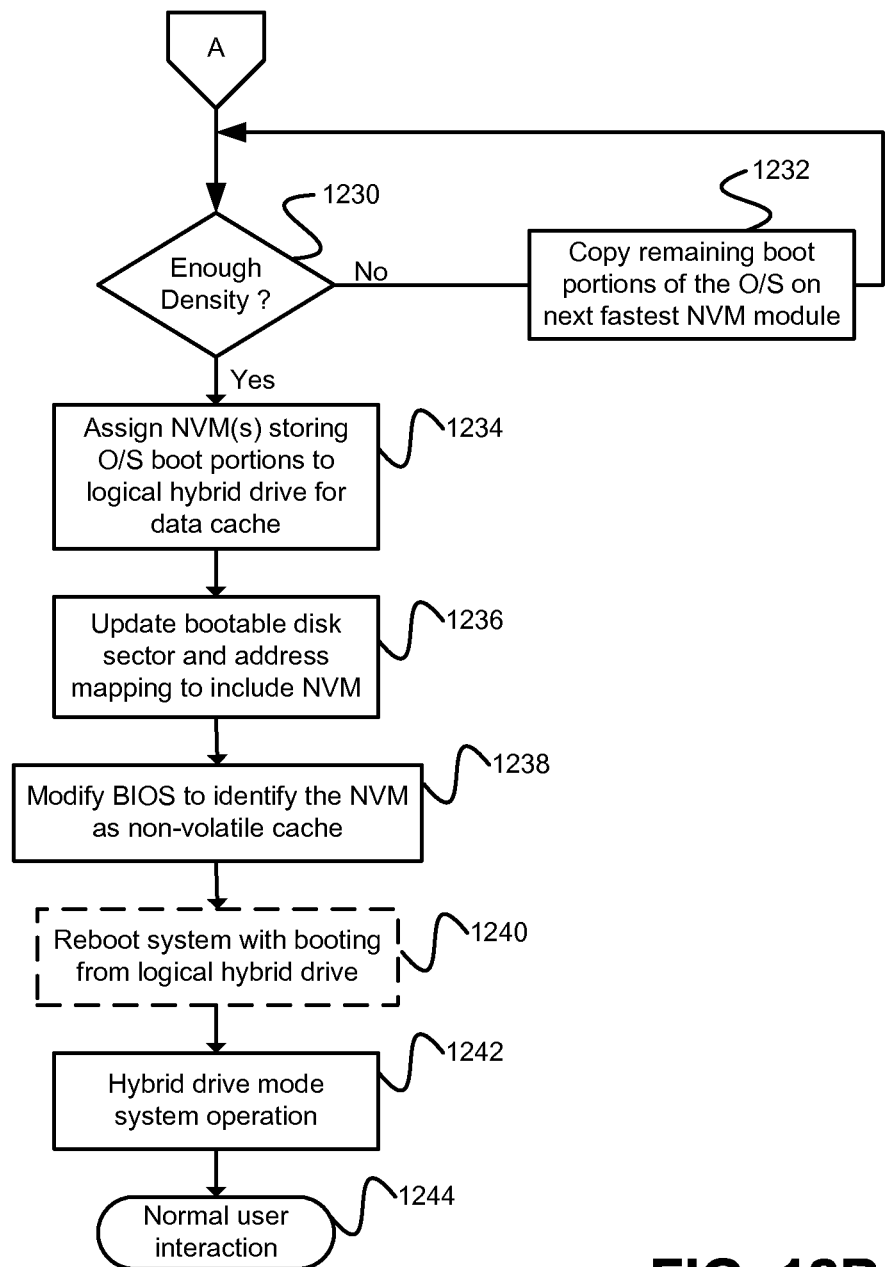

FIGS. 12A and 12B illustrate a method of enabling a hybrid cache mode in a non-volatile memory according to another embodiment of the present disclosure. These figures can be described as illustrating a method of configuring a NVM including a plurality of NVM modules, in a computer system having an HDD and an O/S.

Steps 1202, 1204, 1206 and 1208 in FIG. 12A are similar to previously described steps 302, 304, 320 and 306, respectively, in FIG. 3, and require no further discussion herein. In step 1210, all attached NVM modules are detected. The NVM modules can be NVM cards and/or NVM drives. Each of the plurality of NVM modules is ranked, in step 1212, according to speed performance. In response to the user selection, a first portion of boot portions of the O/S is copied to the highest ranked NVM module in step 1218. If the highest ranked NVM module has sufficient capacity, all of the boot portions of the O/S can be copied thereto.

The method can include step 1214 of storing speed performance information to the HDD until updated new information is created. The method can also include step 1216 of identifying the best performing NVM module, or the best performing NVM modules, in order to rank the NVM modules based on speed performance. As shown in FIG. 12B, step 1234 includes assigning NVM module(s) storing O/S boot portions to the logical hybrid drive of the computer system. In this example, step 1234 can include assigning the HDD and the highest ranked NVM module as a logical hybrid drive of the computer system.

The ranking of the NVM modules according to speed performance can be based on stored speed information and/or on empirically obtained speed information. Referring back to FIG. 12A, step 1210 can include step 1220 of detecting stored speed performance information for the attached NVM modules. For example, in some cases, default information can be stored in the O/S with respect to the general performance of each NVM, and obtained therefrom. In another example, an NVM module may have stored thereon default speed performance information. The plurality of NVM modules can be ranked based on the stored performance information.

As shown in FIG. 12A, step 1212 can include a further step 1222 of carrying out a speed performance test for all NVM modules. The plurality of NVM modules can be ranked based on results of the speed performance test. In an embodiment, the step 1222 can include: sending a performance checking pattern to the plurality of NVM modules; and receiving a speed performance test result for each of the plurality of NVM modules. The speed performance test result can be implementation-specific speed performance information, such as relating to read speed performance.

The performance checking pattern in step 1222 can comprise a pseudo-random pattern, such as a pseudo-random pattern that is generated, for example by a performance checking pattern generator. In an embodiment, such a pseudo-random pattern can be a repeatable pattern with an expected code sequence. Step 1212 can further include step 1224 of generating a performance table for the plurality of NVM modules.

In an embodiment, steps 1222 and 1224 can be performed in instances where no stored information can be detected in step 1220, or is otherwise unavailable, for one or more of the NVM modules. In another embodiment, steps 1222 and 1224 can be performed after stored information has been detected in step 1220, in order to obtain implementation-specific speed performance information that can be more reliable than the stored information. The speed performance information obtained in step 1222, and optionally stored as in step 1224, takes into account implementation-specific aspects such as location of the NVM module within the computer system, performance effects of connectors, and variation of the NVM module performance from expected speed performance. The plurality of NVM modules can then be re-ranked based on the received performance information.

Referring now to FIG. 12B, if it is determined in step 1230 that the best performing NVM module has enough density to store the entire boot portions of the O/S, then the method proceeds in step 1234 to assigning the NVM storing the O/S boot portions to the logical hybrid drive of the computer system.

If it is determined in step 1230 that the best performing NVM module does not have enough density, or capacity, to store the entire boot portions of the O/S, then the method proceeds in step 1232 to store remaining boot portions of the O/S on the next fastest, or next highest ranked, NVM module. For example, step 1232 can include copying a second portion of boot portions of the O/S to the second highest ranked NVM module. In that case, step 1234 can include assigning the HDD, the highest ranked NVM module and the second highest ranked NVM module as a logical hybrid drive of the computer system.

The method then returns to step 1230 to determine if the second highest ranked NVM module has enough density to store the remaining boot portions of the O/S. If the determination in step 1230 is negative, a further portion of the remaining boot portions of the O/S are stored in the next fastest NVM module. The process can be repeated until all of the boot portions of the O/S are stored on the highest ranking, or fastest, NVM modules.

Steps 1236 to 1244 in FIG. 12B are similar to previously described steps 314 to 320 in FIG. 3, and require no further discussion herein. Step 1240 is optional, depending on the O/S.

Figure 13:
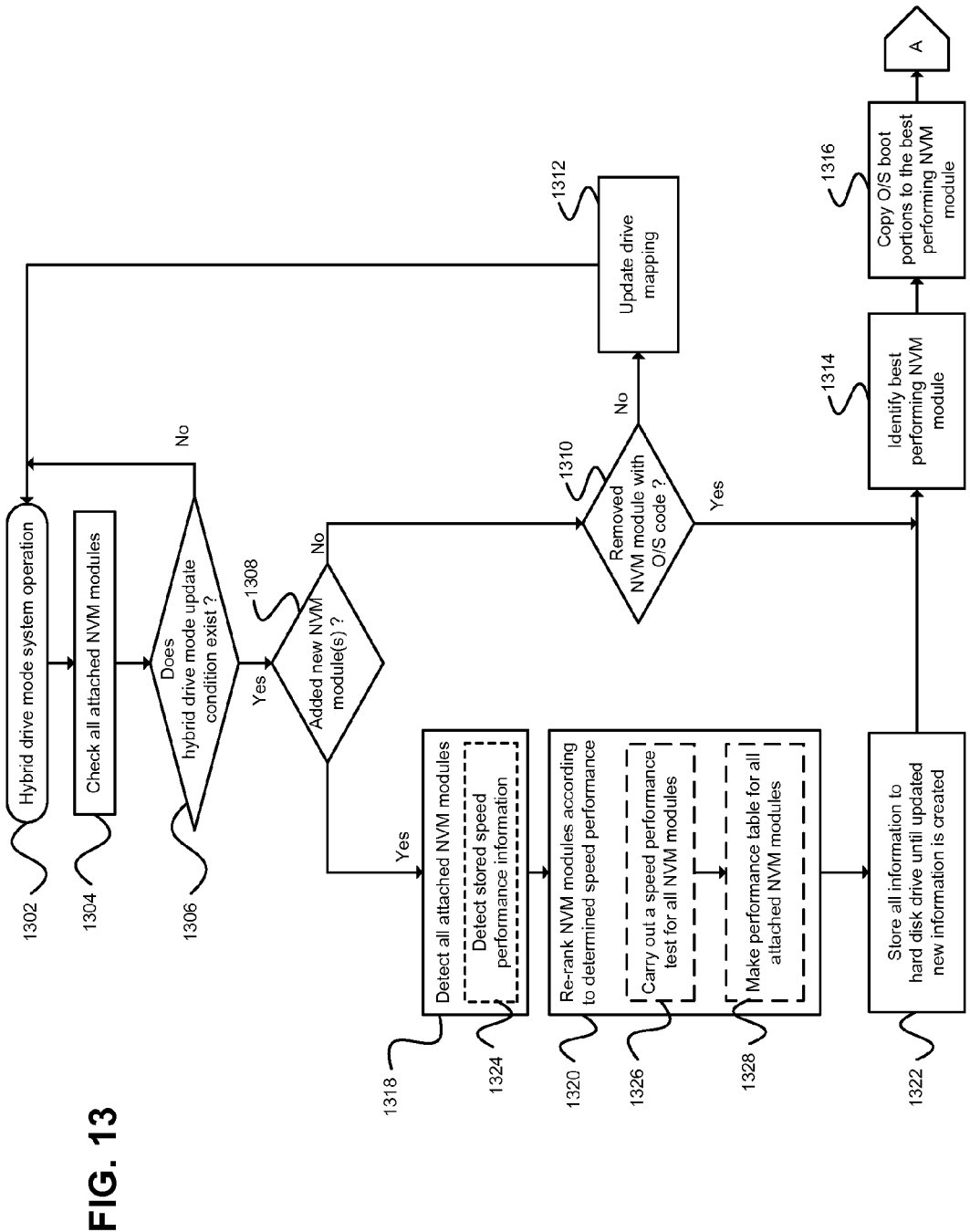
FIG. 13 illustrates a method of enabling a hybrid cache mode in a non-volatile memory according to another embodiment of the present disclosure, including cases of NVM connection modification.

FIG. 13 illustrates a method of processing a hybrid drive mode update condition in a non-volatile memory according to another embodiment of the present disclosure, including cases of NVM connection modification. As used herein, the term NVM connection modification refers to a modification, such as addition or removal, of one or more NVM modules connected to a computer system. The method of FIG. 13 can be performed, for example, after an initial speed performance check has been performed with respect to the NVM modules in the system, such as illustrated in FIG. 12A and FIG. 12B.

The method of FIG. 13 can be generally described as: detecting an NVM connection modification; and altering a logical hybrid drive definition based on the detected NVM connection modification. The method begins in step 1302 with the system in hybrid drive mode system operation. All of the attached NVM modules are checked in step 1304.

In step 1306, a determination is made whether a hybrid drive mode update condition exists. This determination can be based on detection of an NVM connection modification. The NVM connection modification can be removal of an NVM module, addition of an NVM module, or both. If the determination in step 1306 is No, the method returns to hybrid drive mode system operation in step 1302.

If the determination in step 1306 is Yes, a further determination is made in step 1308 whether a new NVM module has been added. If no new NVM modules have been added, a further determination is made in step 1310 whether an NVM module with O/S boot portions has been removed. If the determination in step 1310 is No, this means that an NVM storing data, and not O/S boot portions, was removed. In that case, the drive mapping is updated in step 1312. For example, if a data storage NVM that had been assigned drive label F: is removed, the drive label F: is cleared, and may be re-assigned. The step 1312 can include a sub-step of updating system settings to store data to the HDD, in the absence of the removed data storage NVM.

If the answer to step 1310 is Yes, this means that an NVM module with O/S boot portions has been removed, and that no new NVM modules have been added. In this case, the method proceeds to identify the best performing NVM module in step 1314, and to copy O/S boot portions to the best performing NVM module in step 1316.

The steps 1314 and 1316 are performed with respect to the remaining attached NVM modules, taking into account that the rankings with respect to speed performance may have changed due to removal of an NVM module storing boot portions of the O/S. After step 1316, the method proceeds to step 1230 in FIG. 12B, and executes that step and subsequent steps, as described in detail above.

In an implementation, steps 1314 and 1316 and related subsequent steps can be described as: copying the first portion of boot portions of the O/S to the highest ranked remaining NVM module; copying the second portion of boot portions of the O/S to the second highest ranked remaining NVM module; and assigning the HDD and the highest and second highest ranked remaining NVM modules as a logical hybrid drive of the computer system.

If the determination in step 1308 is that one or more new NVM modules have been added, the method proceeds to steps 1318, 1320, and 1322 with optional sub-steps 1324, 1326 and 1328. These steps are similar to the steps 1210, 1212 and 1214, with optional sub-steps 1220, 1222 and 1224, and require no further detailed discussion. It is worth noting that step 1318 comprises detecting addition of an additional NVM module to create a new plurality of NVM modules on which the ranking, or re-ranking, in step 1320 will be based. It is also worth noting that the steps 1318, 1320 and 1322 are performed any time a new NVM module is added, regardless of whether another NVM module storing data or O/S bootable code was also removed since the last check of the NVM modules.

In an implementation, step 1320 and related subsequent steps can be described as: re-ranking each of the new plurality of NVM modules according to speed performance; copying the first portion of boot portions of the O/S to the highest re-ranked NVM module in the new plurality of NVM modules; copying the second portion of boot portions of the O/S to the second highest re-ranked NVM module in the new plurality of NVM modules; and assigning the HDD and the highest re-ranked NVM module and the second highest re-ranked NVM module in the new plurality of NVM modules as a logical hybrid drive of the computer system.

In an implementation, step 1326 can include re-sending a performance checking pattern to each of the new plurality of NVM modules, and step 1328 can include redefining the performance table.

Embodiments have thus far been described herein with respect to ranking NVM modules based on speed performance. The ranking can permit a higher capacity NVM module to be ranked higher than a lower capacity NVM module having substantially the same speed performance. In some cases, it can be advantageous and less computationally intensive to simply determine speed performance and select fastest and second fastest NVM modules.

In other words, in an aspect, the present disclosure provides a method of configuring an NVM including a plurality of NVM modules, in a computer system having an HDD and an O/S, the method including: receiving a user selection of a hybrid drive mode for the NVM, determining a speed performance for each of the plurality of NVM modules; in response to the user selection, copying boot portions of the O/S to the fastest NVM module; and assigning the HDD and the fastest NVM module as a logical hybrid drive of the computer system.

In an embodiment, the method can further include: copying a second portion of boot portions of the O/S to the second fastest NVM module; and assigning the second fastest NVM module to the logical hybrid drive of the computer system.

Determining the speed performance for each of the plurality of NVM modules can include carrying out a speed performance test. Carrying out the speed performance test can include: sending a performance checking pattern to the plurality of NVM modules; and receiving a speed performance test result for each of the plurality of NVM modules.

In an embodiment, determining the speed performance for each of the plurality of NVM modules can include detecting stored speed performance information and further include carrying out a speed performance test, and determining the speed performance based on results of the speed performance test.

Copying the first portion of boot portions of the O/S to the fastest NVM module can include: determining that the fastest NVM module has sufficient capacity to store an indivisible boot portion within the first portion. The first and second portions of boot portions of the O/S can have first and second sizes, respectively, in which case the method can further include, before copying the first portion of boot portions of the O/S to the fastest NVM module: defining the first and second sizes based on defined indivisible boot portions within the boot portions of the O/S.

The method can further include: detecting an NVM connection modification; and altering a logical hybrid drive definition based on the detected NVM connection modification.

Detecting the NVM connection modification can include detecting removal of the fastest NVM module or the second fastest module, the fastest and second fastest NVM modules having boot portions of the O/S copied thereon. In such an embodiment, altering the logical hybrid drive definition can include, in relation to remaining NVM modules: copying the first portion of boot portions of the O/S to the fastest remaining NVM module; copying the second portion of boot portions of the O/S to the second fastest remaining NVM module; and assigning the HDD and the fastest and second fastest remaining NVM modules as a logical hybrid drive of the computer system.

Detecting the NVM connection modification can include detecting addition of an additional NVM module to create a new plurality of NVM modules. In such an embodiment, altering the logical hybrid drive definition can include: determining a speed performance the additional NVM module; copying the first portion of boot portions of the O/S to the fastest NVM module in the new plurality of NVM modules; copying the second portion of boot portions of the O/S to the second fastest NVM module in the new plurality of NVM modules; and assigning the HDD and the fastest NVM module and the second fastest NVM module in the new plurality of NVM modules as a logical hybrid drive of the computer system.

Figure 14A:
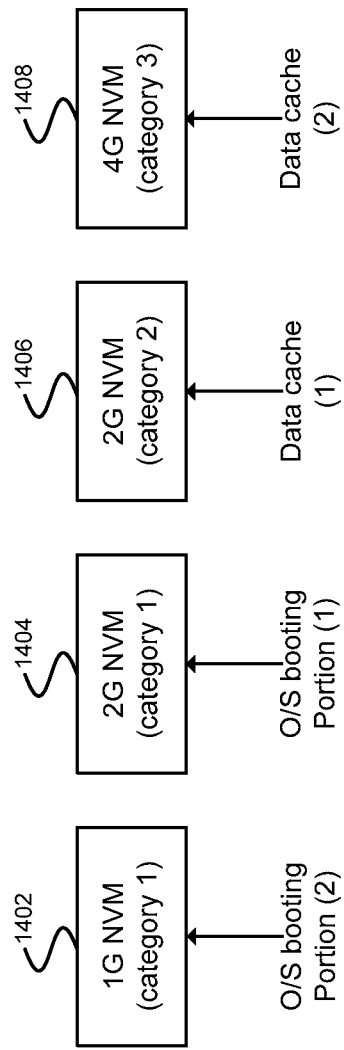
FIGS. 14A and 14B illustrate examples of bootable O/S code assignment in multiple NVM attachment according to another embodiment of the present disclosure.
Figure 14B:
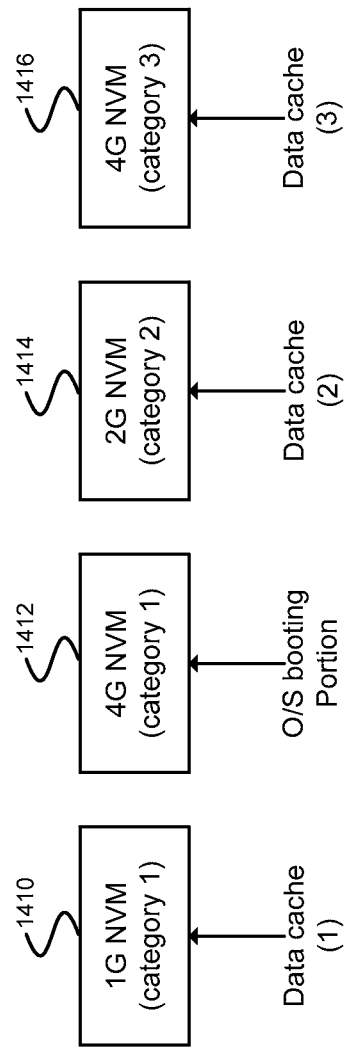

FIGS. 14A and 14B illustrate examples of bootable O/S code assignment in multiple NVM attachment according to another embodiment of the present disclosure. In these figures, category rankings are used to describe the speed performance of the NVMs. In this example, a speed rating of category 1 is faster than category 2, which in turn is faster than category 3.

FIGS. 14A and 14B can relate to an implementation in which the O/S includes all NVM performance information as default. For this case, the optional steps 1222 and 1224 in FIG. 12A, or optional steps 1326 and 1328 in FIG. 13, are omitted. In an embodiment, the performance information is rearranged by O/S when the system is booted. If there are multiple NVM devices with same speed class and device code provided by manufacturer, a method according to an embodiment of the present disclosure can assign the higher density device as a first access NVM device for booting portion and O/S operating code storage element.

For example, this can be described as: 1) best performance NVM is searched for all attached NVM devices by the performance information; and 2) if multiple same class and same form factor NVM devices are detected, higher density NVM device is chosen as a first solid disk element.

As illustrated in FIG. 14A, NVMs 1402 and 1404 have the same speed performance, as they are both category 1. Since NVM 1404 has a higher capacity, a first portion of boot portions of the O/S is copied thereto, and a second portion is copied to NVM 1402. According to an embodiment of the present disclosure, the NVM 1406 is assigned as a data cache, since it has a worse speed performance, category 2, compared to NVM 1404, though they have the same capacity. Similarly, the NVM 1408 is assigned as a data cache, since it has an even worse speed performance, category 3, compared to all of the other NVMs, though it has the highest capacity and would have been able to store all of the boot portions of the O/S.

In an embodiment, ranking each of the plurality of NVM modules can comprise ranking the first NVM module higher than the second NVM module when the first and second NVM modules have substantially the same speed performance and the first NVM module has a higher capacity than the second NVM module.

As illustrated in FIG. 14B, NVMs 1410 and 1412 have the same speed performance, as they are both category 1. Since NVM 1412 has a higher capacity, and in fact has sufficient capacity for all of the boot portions of the O/S, they are all copied thereto. The remaining NVMs 1410, 1414 and 1416 are assigned as a data cache.

FIG. 15 illustrates division of first and second boot portions of bootable O/S code taking into account an indivisible boot portion. In some cases, the O/S code can have an indivisible boot portion that will affect the total performance of the system if it is divided up on more than one physical storage medium. For example, the indivisible boot portion can have nested loops that may not execute properly if the indivisible boot portion is separated on more than one physical storage medium. The indivisible boot portion size can be determined by the O/S, or manually, or automatically, or by the user.

The bootable O/S code 1502 is shown in FIG. 15 as having a first portion 1504 and a second portion 1506, initially stored on an HDD 1508. In a method according to an embodiment of the present disclosure, copying the first portion of boot portions of the O/S to the highest ranked NVM module can comprise determining that the highest ranked NVM module has sufficient capacity to store an indivisible boot portion within the first portion. For example, if the first portion 1504 is determined to be an indivisible boot portion, then a determination is made whether the NVM1 1510 has sufficient capacity to store the first portion 1504. In this case, the NVM1 1510 does have sufficient capacity.

In another embodiment, the first and second portions of boot portions of the O/S can have first and second sizes, respectively. In that case, the method can further comprise, before copying the first portion of boot portions of the O/S to the highest ranked NVM module, defining the first and second sizes based on defined indivisible boot portions within the boot portions of the O/S.

With reference to FIG. 15, the first portion 1504 can be stored in NVM 1 1510 since it has the highest speed rating. A second portion 1506 can be stored in NVM2 1512, since it has a good speed rating, and has sufficient capacity to store the remaining data in the bootable O/S code 1502.

One consideration in dividing the bootable O/S code 1502 to fit on multiple NVMs relates to assigning the address. For instance, suppose the first portion 1504 starts at address 00 and ends at address 1F on the HDD 1508. Then suppose the second portion 1506 starts at address 200 and ends at address 400 on the HDD 1508. The start and end addresses of the first portion 1504 are assigned to the start and end of the NVM1 1510, or first NVM.

In another implementation, it can be that, due to physical division of NVMs, the NVM1 1510 can have a worse performance in implementation even though the NVM1 1510 is the fastest one. For example, in a case when NVM1 1510 has a capacity of 64 MB and NVM2 1512 has a capacity of 2 GB, the potential benefit of using NVM1 can be ignored if it has a minimal effect on performance. The effect on performance can be determined, for example, based on one or more of: capacity; speed; indivisible boot portion size; and position of NVM on board. In an implementation, if the indivisible boot portion size is 2.5 GB, an NVM of 2 GB will not be sufficient for storing that indivisible boot portion.

NVMs have all types of form factor, and using a hybrid drive according to an embodiment of the present disclosure provides better performance than the hard disk alone. Certain embodiments described herein also consider the relative speed performance of each NVM in a hybrid disk. Embodiments of the present disclosure provide a simple and automatic method of automatically determining which NVM provides the best performance.

Each physical device has its own physical address, but typically the O/S uses a logical address. For example, suppose the physical addresses are: 00+00 . . . 1F (first portion 1504 as stored in hard disk); and 00+200 . . . 400 (second portion 1506 as stored in hard disk). Instead, logical addresses as follows can be used: 01+00 . . . 1F (first portion 1504 as stored in NVM1 1510); and 10+200 . . . 400 (second portion 1506 as stored in NVM2 1512).

In the case where the O/S boot portion is bigger than the size of all of the multiple NVMs, and some of the O/S boot portion remains on the HDD, a performance improvement is still obtained. For example, consider a scenario in which 20% of the O/S bootable code is in NVM1, 40% is in NVM2, and 40% remains on the hard disk. The access speeds on the NVM1 and NVM2 are much faster than the access speed of the hard drive.

Consider a generalized scenario in which the bootable O/S code is fully on the HDD, with the HDD having a normalized speed performance rating of 100. Then consider a second scenario of a hybrid disk in which 50% of the bootable O/S code is on an NVM, and the remaining 50% is on the HDD. Consider the NVM having a normalized speed performance rating of 50, being twice as fast as the HDD. In this second scenario, with the NVM having a performance that is twice as fast as that of the HDD, then the hybrid drive will have a speed performance rating of 75, which is 25% faster that the HDD alone.

A speed performance of a hybrid drive system, $P_{HYBRID}$, according to an embodiment of the present disclosure having a hard disk drive and two NVMs can be represented as follows:

$$P_{HYBRID} = aP_{HDD} + bP_{NVM1} + cP_{NVM2}$$

where:
a represents the fraction of the bootable O/S code stored on the hard disk drive
$P_{HDD}$ represents the speed performance of the hard disk drive
b represents the fraction of the bootable O/S code stored on the NVM1
$P_{NVM1}$ represents the speed performance of the NVM1
c represents the fraction of the bootable O/S code stored on the NVM2
$P_{HDD}$ represents the speed performance of the NVM2

Therefore, according to an embodiment of the present disclosure, if $P_{NVM1} > P_{NVM2}$, then generally NVM1 will be chosen first to be part of the hybrid drive, based on its higher performance in terms of speed. More generally, the NVM with the highest performance among all NVMs available in the system can be chosen first to be part of the hybrid drive. For example, if $P_{NVM1} = 4$ and $P_{NVM2} = 2$, then NVM1 will be used first as part of the hybrid drive. The NVM with the next highest performance can then be selected to also be part of the hybrid drive, if there is more O/S bootable code that can be exported to another NVM.

The O/S can store information about which portions of the code are critical to improve the performance. According to an embodiment of the present disclosure, the critical portions can be stored in the NVM(S) with the highest performance.

FIG. 16 illustrates an example of an NVM performance table 1602 generated according to an embodiment of the present disclosure. The performance table 1602 can include information based on sending a performance checking pattern and receiving related results, and can optionally includes stored performance information, when available.

In the example of FIG. 16, the table 1602 includes general NVM module information such as NVM location 1604 and NVM type 1606. An NVM density 1608 is also provided, to indicate capacity. When results of a performance test are available, such as based on sending a performance checking pattern and receiving related results, they can be stored in a test result column 1610. In this example, the test result 1610 is a pseudo-random test result. An NVM performance rank 1612 is provided, to indicate a relative rank of each NVM module with respect to speed performance. As mentioned earlier, the performance rank 1612 can be based on the speed performance result. In the case where two NVM modules have a substantially similar speed performance result 1610, NVM density 1608 can also be taken into account for the performance rank 1612.

As described generally earlier, if an O/S cannot recognize the performance of each NVM module based on stored information, a performance checking pattern can be sent to determine NVM module performance. The performance checking pattern can be a pseudo-random pattern that is generated with simple logic code installed in O/S. For example, a performance checking pattern generator can be provided according to an embodiment of the present disclosure.

In an embodiment, one of the characteristics of such a pseudo-random pattern is that it is a repeatable pattern with expected code sequence. Using this pattern, an embodiment of the present disclosure can check the performance of all connected NVM modules and create a performance table. Unlike the case which has all information of connected NVM modules, this case manages speed grades of all connected NVM modules. So, a performance table is provided, and their contents are used to determine the best performance NVM module(s) of all attached NVM modules.

In another implementation, even though the O/S has some speed performance information for all available NVM modules, this information can change, or can be less accurate with respect to the specific implementation. In such an implementation, a performance checking pattern can be sent to determine the best performance NVM module, even in the presence of some stored speed performance information. If the NVM modules had been ranked based on the stored speed performance information, they can be re-ranked based on the results of sending the performance checking pattern.

In the embodiments described above, the device elements and circuits are connected to each other as shown in the figures, for the sake of simplicity. In practical applications of the present disclosure to a hybrid drive configuration of NVM and HDD, circuits, elements, devices, etc. may be connected directly to each other. As well, circuits, elements, devices, etc. may be connected indirectly to each other through other circuits, elements, devices, etc., necessary for operation of a hybrid disk configuration of NVM and HDD. Thus, in actual configuration of the hybrid disk, the circuit, elements, devices, etc. are coupled with (directly or indirectly connected to) each other.

The above-described embodiments are intended to be examples only. Alterations, modifications and variations can be effected to the particular embodiments by those of skill in the art without departing from the scope, which is defined solely by the claims appended hereto.

What is claimed is:

1. A method of configuring a non-volatile memory (NVM) including a plurality of NVM modules, in a system having a hard disk drive (HDD) and an operating system (O/S), the method comprising:
   ranking each of the plurality of NVM modules according to speed performance;
   in response to the user selection, copying boot portions of the O/S to the highest ranked NVM module; and
   assigning the HDD and the highest ranked NVM module as a logical hybrid drive of the computer system.

2. The method of claim 1 wherein:
   copying boot portions of the O/S to the highest ranked NVM module comprises:
   copying a first portion of boot portions of the O/S to the highest ranked NVM module, and
   the method further comprising:
   copying a second portion of boot portions of the O/S to the second highest ranked NVM module; and
   assigning the second highest ranked NVM module to the logical hybrid drive of the computer system.

3. The method of claim 2 wherein ranking each of the plurality of NVM modules comprises carrying out a speed performance test, wherein the plurality of NVM modules are ranked based on results of the speed performance test.

4. The method of claim 3 wherein carrying out the speed performance test comprises:
   sending a performance checking pattern to the plurality of NVM modules; and receiving a speed performance test result for each of the plurality of NVM modules.

5. The method of claim 2 wherein ranking each of the plurality of NVM modules comprises detecting stored speed performance information, and wherein the plurality of NVM modules are ranked based on the stored performance information.

6. The method of claim 5 wherein ranking each of the plurality of NVM modules further comprises carrying out a speed performance test, wherein the plurality of NVM modules are re-ranked based on results of the speed performance test.

7. The method of claim 6 wherein carrying out the speed performance test comprises:
sending a performance checking pattern to the plurality of NVM modules; and receiving a speed performance test result for each of the plurality of NVM modules.

8. The method of claim 2 wherein ranking each of the plurality of NVM modules comprises generating a performance table for the plurality of NVM modules.

9. The method of claim 2 wherein ranking each of the plurality of NVM modules comprises ranking the first NVM module higher than the second NVM module when the first and second NVM modules have substantially the same speed performance and the first NVM module has a higher capacity than the second NVM module.

10. The method of claim 2 wherein copying the first portion of boot portions of the O/S to the highest ranked NVM module comprises:
determining that the highest ranked NVM module has sufficient capacity to store an indivisible boot portion within the first portion.

11. The method of claim 2 wherein the first and second portions of boot portions of the O/S have first and second sizes, respectively, and further comprising, before copying the first portion of boot portions of the O/S to the highest ranked NVM module:
defining the first and second sizes based on defined indivisible boot portions within the boot portions of the O/S.

12. The method of claim 2 further comprising:
detecting an NVM connection modification; and
altering a logical hybrid drive definition based on the detected NVM connection modification.

13. The method of claim 12 wherein detecting the NVM connection modification comprises detecting removal of the first NVM module or the second NVM module, the first and second NVM modules having boot portions of the O/S copied thereon, and
wherein altering the logical hybrid drive definition comprises, in relation to NVM modules remaining after the removal,
copying the first portion of boot portions of the O/S to the highest ranked remaining NVM module;
copying the second portion of boot portions of the O/S to the second highest ranked remaining NVM module; and
assigning the HDD and the highest and second highest ranked remaining NVM modules as a logical hybrid drive of the computer system.

14. The method of claim 12 wherein detecting the NVM connection modification comprises detecting addition of an additional NVM module to create a new plurality of NVM modules, and
wherein altering the logical hybrid drive definition comprises, re-ranking each of the new plurality of NVM modules according to speed performance;
copying the first portion of boot portions of the O/S to the highest re-ranked NVM module in the new plurality of NVM modules;
copying the second portion of boot portions of the O/S to the second highest re-ranked NVM module in the new plurality of NVM modules; and
assigning the HDD and the highest re-ranked NVM module and the second highest re-ranked NVM module in the new plurality of NVM modules as a logical hybrid drive of the computer system.

15. A computer system including a hard disk drive (HDD), a non-volatile memory (NVM) including first and second NVM modules and an operating system (O/S), comprising:
a machine-readable medium storing commands and instructions which, when executed, cause a processor to perform a method of configuring a non-volatile memory, the method including:
ranking each of the plurality of NVM modules according to speed performance;
in response to the user selection:
copying boot portions of the O/S to the highest ranked NVM module;
assigning the HDD and the highest ranked NVM module as a logical hybrid drive of the computer system.

16. The computer system of claim 15 wherein, in the method:
copying boot portions of the O/S to the highest ranked NVM module comprises:
copying a first portion of boot portions of the O/S to the highest ranked NVM module, and
the method further comprising:
copying a second portion of boot portions of the O/S to the second highest ranked NVM module; and
assigning the second highest ranked NVM module to the logical hybrid drive of the computer system.

17. The computer system of claim 15 wherein the NVM is removable and replaceable without performing an internal computer system hardware upgrade.

18. The computer system of claim 15 wherein the NVM comprises a flash memory card.

19. The computer system of claim 15 further comprising a receiver for receiving the NVM, the receiver being in electrical communication with the processor.

20. The computer system of claim 19 wherein the receiver comprises a slot for receiving the NVM, the slot being accessible by a user without opening an outer casing of the computer system, the slot including a securing means to prevent disconnection of the NVM when the NVM is being used in hybrid drive mode.

21. A non-transitory machine-readable medium storing commands and instructions which, when executed, cause a processor to perform a method of configuring a non-volatile memory (NVM) including first and second NVM modules in a computer system having a hard disk drive (HDD), and an operating system (O/S), the method comprising:
ranking each of the plurality of NVM modules according to speed performance;
in response to the user selection, copying boot portions of the O/S to the highest ranked NVM module; and
assigning the HDD and the highest ranked NVM module as a logical hybrid drive of the computer system.

* * * * *